United States Patent
Iwai

(10) Patent No.: US 7,126,702 B2
(45) Date of Patent: Oct. 24, 2006

(54) MEDIUM HAVING PRINT-CONTROL PROGRAM, APPARATUS AND METHOD FOR PRINT CONTROL

(75) Inventor: Azusa Iwai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 555 days.

(21) Appl. No.: 10/026,969

(22) Filed: Dec. 27, 2001

(65) Prior Publication Data

US 2002/0163660 A1 Nov. 7, 2002

(30) Foreign Application Priority Data

Mar. 13, 2001 (JP) ............................. 2001-070238

(51) Int. Cl.
- B41B 1/00 (2006.01)
- G06F 15/00 (2006.01)
- G06K 1/00 (2006.01)

(52) U.S. Cl. .................. 358/1.13; 358/1.15; 358/1.16; 358/1.17; 358/1.18; 358/1.2

(58) Field of Classification Search ............... 358/1.13, 358/1.16, 1.18, 1.11, 1.15, 1.17, 1.2; 399/82; 400/76

See application file for complete search history.

(56) References Cited

U.S. PATENT DOCUMENTS

| | | | | |
|---|---|---|---|---|
| 5,737,503 | A * | 4/1998 | Mitani ....................... | 358/1.16 |
| 6,014,224 | A * | 1/2000 | Mitani ....................... | 358/1.16 |
| 6,226,095 | B1 * | 5/2001 | Fukuta ...................... | 358/1.13 |
| 6,310,693 | B1 * | 10/2001 | Hiraike ..................... | 358/1.15 |
| 6,330,072 | B1 * | 12/2001 | Barada et al. ............. | 358/1.18 |
| 6,337,744 | B1 * | 1/2002 | Kuroda ..................... | 358/1.13 |
| 6,337,961 | B1 * | 1/2002 | Mori et al. ................. | 399/82 |
| 6,394,673 | B1 * | 5/2002 | Horigane .................. | 400/76 |
| 6,433,882 | B1 * | 8/2002 | Mori et al. ................. | 358/1.13 |
| 6,456,390 | B1 * | 9/2002 | Okubo et al. ............. | 358/1.17 |
| 6,493,099 | B1 * | 12/2002 | Nakagiri .................... | 358/1.13 |
| 6,507,411 | B1 * | 1/2003 | Nishikawa et al. ......... | 358/1.2 |
| 6,535,292 | B1 * | 3/2003 | Kuroi ....................... | 358/1.11 |
| 6,538,764 | B1 * | 3/2003 | Ueda ........................ | 358/1.16 |
| 6,580,521 | B1 * | 6/2003 | Nishikawa et al. ......... | 358/1.18 |
| 6,633,399 | B1 * | 10/2003 | Fukazawa .................. | 358/1.15 |
| 6,661,531 | B1 * | 12/2003 | Murphy et al. ............ | 358/1.15 |
| 6,809,832 | B1 * | 10/2004 | Kubota ...................... | 358/1.16 |
| 6,819,447 | B1 * | 11/2004 | Sawano ..................... | 358/1.16 |
| 6,833,930 | B1 * | 12/2004 | Nishikawa et al. ......... | 358/1.2 |

FOREIGN PATENT DOCUMENTS

| | | |
|---|---|---|
| JP | 10-260804 | 9/1998 |
| JP | 2000-211198 | 8/2000 |

* cited by examiner

Primary Examiner—Kimberly Williams
Assistant Examiner—Satwant Singh
(74) Attorney, Agent, or Firm—Mattingly, Stanger, Malur & Brundidge, P.C.

(57) ABSTRACT

During print operation, it sometimes happened that an intermediate file of print data becomes so huge in gigabytes as to make printing impossible. The present invention is constituted to permit a computer: a print data acquisition step P1 to acquire print data; an intermediate file creation step P2 to divide the acquired print data into parts while keeping the file size of each parts within certain bounds and thereby create a plurality of intermediate files, and an actual-data-for-printing creation step P3 to read the created intermediate files into the memory for pre-determined conversions, and thereby create actual-data-for-printing. The effect is that the intermediate file size does not become so huge as to make printing impossible, and therefore printing can certainly be done even if a huge amount of print data is created.

8 Claims, 29 Drawing Sheets

Fig. 9

| Color Data (per Pixel) | | | | | | | | |
|---|---|---|---|---|---|---|---|---|
| A11 | A12 | A13 | A14 | A15 | ---- | | | |
| A21 | A22 | A23 | A24 | A25 | ---- | | | |
| A31 | A32 | A33 | A34 | A35 | ---- | | | |
| A41 | A42 | A43 | A44 | A45 | ---- | | | |
| ---- | | | | | | | | |
| | | | | | | | | |
| | | | | | | | | |
| | | | | | | | | |

Fig. 12

Intermediate File F11 (384MB max.)

| Address | Unit to Draw |
|---|---|
| 00410000 | U1 |
| 00410100 | U2 |
| ......... | ......... |
| 183FFFFF | |

Intermediate File F12 (384MB max.)

| Address | Unit to Draw |
|---|---|
| 18410000 | U3 |
| ..... | ..... |
| 18524000 | U4 |
| ......... | ......... |
| 303FFFFF | |

Intermediate File F13 (384MB max.)

| Address | Unit to Draw |
|---|---|
| 30410000 | U5 |
| ..... | ..... |
| 3063C000 | U6 |
| ......... | ......... |

Fig. 13

Record List R1

| Band | Address |
|---|---|
| B1 | 00410000, 00410100, 18410000 |
| B2 | 00410000, 00410100, 18410000 |
| B3 | 00410100, 18410000, 18524000 |
| B4 | 00410100, 30410000, 3063C000 |
| B5 | 00410100, 3063C000 |

Fig. 29

*Record List R1*

Band

| Band | |
|---|---|
| B1 | 00410000 |
| B2 | 00410000, 10410000 |
| B3 | 10410000 |
| B4 | 10410000, 20410000 |
| B5 | 20410000 |

MEDIUM HAVING PRINT-CONTROL PROGRAM, APPARATUS AND METHOD FOR PRINT CONTROL

BACKGROUND OF THE INVENTION

1. Field of the Invention

The present invention relates to a computer-readable medium (referred to as medium hereinafter) having a print-control program, an apparatus and method for print control, wherein the program has the steps of: acquiring print data, creating intermediate files of print data, reading the files into a memory, converting the files, and creating actual-data-for-printing of the file.

2. Description of the Prior Art

Print-control programs of this type have heretofore been used in the way described below. Under the program control, a single intermediate file including instructions to draw is created from print data created by an application program and temporarily stored into a hard disk. The contents of the single intermediate file are read into a RAM and RGB (read, green, and blue) bitmap data is created, according to the thus read instructions to draw. Then, image processing or the like is performed in which RGB bitmap is converted to color data based on CMYK (cyan, magenta, yellow, and black) and actual data to print is created.

In the use of the conventionally used programs for print control described above, such a problem was posed as is described below.

When printing is carried out with a printer for large-size prints, it sometime happened that a huge amount of print data is created and the size of the intermediate file becomes as huge as in gigabytes. In that event, sometimes, attempts to print failed by operation environmental restrictions, for example, insufficient space of the RAM into which the contents of the immediate file must be read or the operating system incapable of handling the RAM of two gigabytes or more.

SUMMARY OF THE INVENTION

The present invention aims at providing medium having a print-control program, an apparatus and method for print control, wherein printing can certainly be done even if a huge amount of print data is created.

Accordingly, the object of the invention is to provide a medium having a print-control program to acquire print data, create intermediate files of the print data, read the files into a memory, convert the files, and thereby create actual-data-for-printing, and the program comprising:

a print data acquisition step to acquire print data;

an intermediate file creation step to divide the acquired print data into parts while keeping the file size of each parts within certain bounds and thereby create a plurality of intermediate files; and an actual-data-for-printing creation step to read the created intermediate files into the memory for pre-determined conversions, and thereby create actual-data-for-printing.

Specifically, in creating a plurality of intermediate files at an intermediate file creation step, the print data acquired at the print data acquisition step can be divided so that file size of the data is kept within certain bounds. And at the actual-data-for-printing creation step, the created intermediate files are read into the memory for predetermined conversions, creating actual-data-for-printing.

Further, setting the bounds to file size in advance while taking account of both free space in the memory into which the intermediate files are read and the specifications of the operating system prevents the intermediate file size from becoming so huge as to make printing impossible. Thus, printing can certainly be done even if a huge amount of print data is created.

The constitution where the bounds to file size is set at predetermined size by default is only one illustration.

Another object of the invention is to provide the print-control program that further comprises a bounds-to-file-size setting step to set the bounds to file size based on a user-preference setting, wherein at said intermediate file creation step, the acquired print data are divided so as to have the file size within certain bounds set by said bounds-to-file-size setting step. This permits user-friendly setting of the bounds to file size.

Further, the bounds-to-file-size may be determined by: a user's setting in advance, instruction from operating system or the like, or optional setting designed for a user. These settings for the bounds to file size enhances usability.

Another object of the invention is to provide the print-control program arranged such that the bounds to file size can change automatically. By way of illustration of this arrangement, in creating a plurality of the intermediate file at said intermediate file creation step, said bounds to file size for determining the file size of the divided print data, depends on free space in the memory.

Determining the bounds to file size according to free space in the memory leads to efficient use of the memory in creating actual-data-for-printing.

Another object of the invention is that in reading the intermediate files into the memory at the actual-data-for-printing creation step, only one of the plurality of intermediate files is read into the memory at a time.

Two or more intermediate files of divisional print data will never simultaneously exist on the memory. This ensures that actual-data-for-printing is created from the intermediate files.

The constitution where at the actual-data-for-printing creation step, a plurality of intermediate file will not simultaneously read into the memory is only one illustration. Alternatively, some of the created intermediate files may be selectively read simultaneously into the memory.

Another object of the invention is that where page print area is partitioned into a plurality of zones and printing is performed on a zone-by-zone basis, when the intermediate files are read into the memory at said actual-data-for-printing creation step, the step may comprise:

creating a record list that makes the intermediate files correspond to a plurality of zones into which page print area is partitioned;

referring to the record list for each target zone; and reading the intermediate files corresponding to the target zone into the memory; and thereby creating actual-data-for-printing for each target zone.

In view of the foregoing, a record list is created that makes the intermediate files correspond to a plurality of zones into which page print area is partitioned; the intermediate files corresponding to the target zone is read into the memory; and actual-data-for-printing for each target zone is created.

Specifically, when the computer creates actual-data-for-printing for each zone into which page print area is partitioned, it will read and load only a necessary intermediate file or files into the memory by referring to the record list. Consequently, the steping time for reading and loading a file into the memory can be shortened. Creating the record list is only an illustration. Alternatively, for example, files corresponding to the zones may be created depending on a user's computer system.

By way of illustration of the possible arrangement using the record list, said actual-data-for-printing creation step further comprises:

registering an address having an instruction unit to draw included in an intermediate file, into said record list in such a manner as to make the address connected with one or a plurality of said zones for all instruction units to draw filed in the intermediate files created;

referencing an address or addresses connected with each target zone from the record list; and reading the instruction unit or units to draw stored at the referenced address or addresses into the memory.

In view of the foregoing, a record list is created to contain the addresses of the instruction units to draw contained in the created intermediate files of divisional print data connected with the plurality of zones into which print page area is partitioned. Under the control of the actual-data-for-printing creation step, for each target zone where printing is to be performed, the computer references the address or addresses of the instruction unit or units to draw connected with the target zone and reads the intermediate file or files corresponding to the referenced address or addresses into the memory.

Even if the name of each intermediate file and the address where the file was temporarily stored are not registered in the record list, the target intermediate file or files can be read into the memory and the instruction unit or units for the object(s) to be drawn within the target zone can be retrieved. Of course, the record list can be organized in various manners and it is possible to register the name of each intermediate file and the address where the file was temporarily stored into the record list.

By the way, some acquired print data may be a huge amount of bitmap data. In view hereof, as possible arrangement, in creating a plurality of intermediate files of divisional bitmap data at said intermediate file creation step, the acquired print data that consists of bitmap data are divided into a plurality of parts of the bitmap data corresponding to said zones.

In view of the foregoing, bitmap data is divided into a plurality of parts and intermediate files are created to contain divisional bitmap data such that each divisional data corresponds with each zone into which page print area is partitioned or the entire bitmap data is divided suitably for the zones. In short, intermediate files of zone-based divisional bitmap data are created.

The above-described medium may be a magnetic recording medium, a magneto-optic recording medium, or any other recording medium which will be developed in future, all of which can be considered applicable to the present invention in all the same way. Embodiment of the present invention as software and hardware combination makes no difference in the concept of the invention. Embodiment of the present invention includes even such a manner of embodiment that part of the print-control program is recorded on a medium in advance and will be read appropriately as required. Furthermore, duplicates of the above medium as primary and secondary duplicate products and the like are considered equivalent to the medium without doubt.

The print-control program of the present invention is implemented on a computer in which it is installed. More broadly, it is easily understandable that the invention is also applicable as a tangible apparatus incorporating such computer. Thus, the present invention is effective as not only the print-control program, but also the apparatus provided with the programmed print control capability. Conceivably, such apparatus for print control may be put into operation in a stand-alone mode or integrated into some equipment or system and put into operation with another methodology. Not limited to a certain mode of operation, the concept of the invention comprehends a variety of modes in which the invention serves and appropriate modifications are permissible within the range of the invention.

Furthermore, print operation controlled by the print-control program of the invention is carried out by following a predetermined control procedure in which the above-described steps of the program are executed appropriately. In view hereof, obviously, the invention underlies that procedure. Thus, the present invention is also applicable as the method for print control.

BRIEF DESCRIPTION OF THE DRAWINGS

FIG. 9 shows color data per pixel constituting bitmap data.

FIG. 12 is an illustration that exemplifies the contents of the created intermediate files of divisional print data.

FIG. 13 is an illustration that exemplifies the contents of a record list.

FIG. 29 is an illustration exemplifying the contents of a record list.

DETAILED DESCRIPTION OF THE PREFERRED EMBODIMENTS

Figure 1:
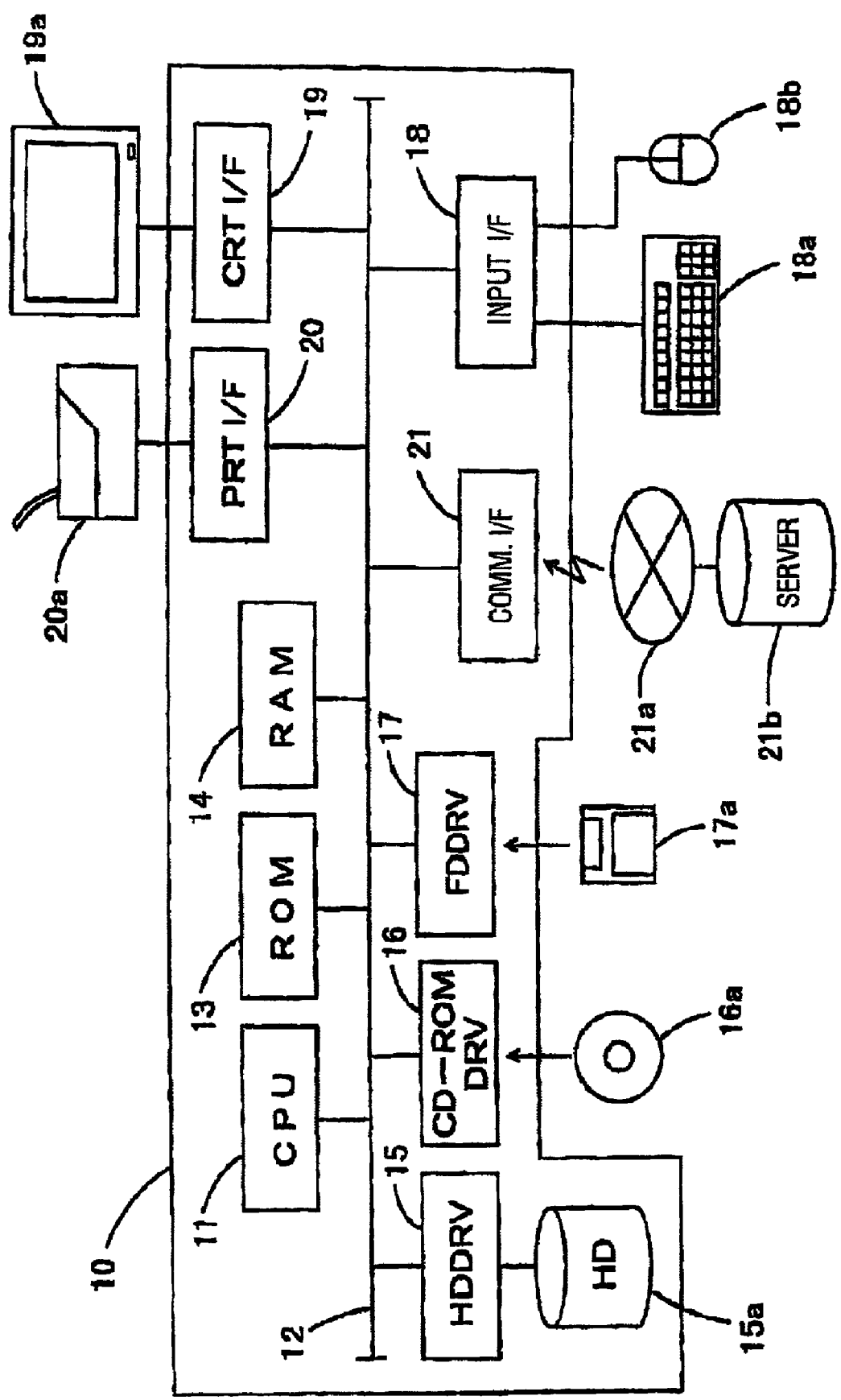
FIG. 1 is a schematic block diagram representing the simplified structure of a computer on which the print-control program provided in accordance with a preferred embodiment of the present invention is executable.

This section describes a preferred embodiment of the present invention in the following aspects which will be described in order:
(1) Configuration of a computer on which the print-control program is executable
(2) Simplified structure of the print-control program
(3) Data state transition by conversion from print data to actual-data-for-printing
(4) Printer driver component modules
(5) Operation of the preferred embodiment (1) Configuration of a Computer on Which the Print-control Program is Executable With reference to the appended drawings, a preferred embodiment of the present invention will be explained below.

FIG. 1 is a schematic block diagram representing the simplified structure of a computer on which the print-control program in accordance with a preferred embodiment of the present invention is executable.

CPU 11 of the computer 10 shown in FIG. 1 is the center of arithmetic steping and can gain access to ROM 13 and RAM 14 over a system bus 12. To the system bus 12, a hard disk drive 15, CD-ROM drive 16, and floppy disk drive 17 which are configured as external storage devices are also connected. In a hard disk 14a for data storage connecting with the hard disk drive 15, software such as an operating system (hereinafter referred to as OS) and application programs (hereinafter referred to as APL) by which text data and image data can be created. Such software, when executed, is transferred to the RAM 14 by the CPU 11 properly. The present print-control program is also stored in the hard disk 15a. The CPU 11 properly accesses the RAM 14 and executes the software stored therein. In other words, the CPU executes kinds of programs by using the RAM 14 as a temporary working area.

To the system bus 12, an input interface 18 is also connected. To the input interface 18, a keyboard 18a and mouse 18b are connected as input devices for user operation. Moreover, to the system bus 12, a CRT interface 19 is connected. A display 19a for display output is connected via the CRT interface 19 to the bus. Furthermore, to the system bus 12, a printer interface 20 is connected. A printer 20a that prints on paper, cloth, etc. for print use, from a specific print job is connected via the printer interface 20 to the bus.

The connection interface between the computer 10 and the printer 20a may be, but not limited to a parallel interface. Diverse connection modes such as serial interface, SCSI, USB connection, etc. can be adopted, including any connection mode which will be developed in future.

The computer 10 in the present preferred embodiment is a so-called desktop-type personal computer and its simplified structure is now explained. However, other types of computers are, of course, applicable. Other examples of the computer 10 that can be used to effect the present invention may be a generally configured computer, notebook-size computer, and computer with mobile features. In short, the computer 10 is not limited to a personal computer.

Although a suite of software required for this preferred embodiment is stored in the hard disk 15a as described above, the storage medium in which the software suite can be stored is not limited to the hard disk 15a. Other storage media, for example, CD-ROM 16a and floppy disk 17a may be used. The software stored in these storage media is read via the CD-ROM drive 16 and floppy disk drive 17, transferred into the computer 10, and installed in the hard disk 15a. Then, the software is read from the hard disk 15a into the RAM 14 by the CPU 11 as described above and a variety of instructions are executed for required steping. In addition to these storage media, a magneto-optic disk or the like may also be used for the same purpose. As a semiconductor device, a non-volatile memory or the like, such as a flash card, can be used. Alternatively, the software suite can be downloaded by connecting the computer to a predetermined communication network 21a via a communication interface 21 such as a modem connected to the system bus 21 and accessing a file server 21b provided in the communication network 21a and capable of storing a variety of programs.

The printer 20a used in the present preferred embodiment is so large as to be capable of printing on paper of A0 size for print use or cloth such as banners. The printer 20a is equipped with a CPU, firmware, and other components, which are not shown. By following the program code written in the firmware, the printer 20a receives actual-data-for-printing sent from the computer 10 via the printer interface 20. The actual-data-for-printing is a print job comprising CMYK-based data, page descriptor code, and the like. The printer 20a performs printing by making its mechanical driving devices work to drive the print head and paper feed mechanisms, based on the actual-data-for-printing.

Figure 2:
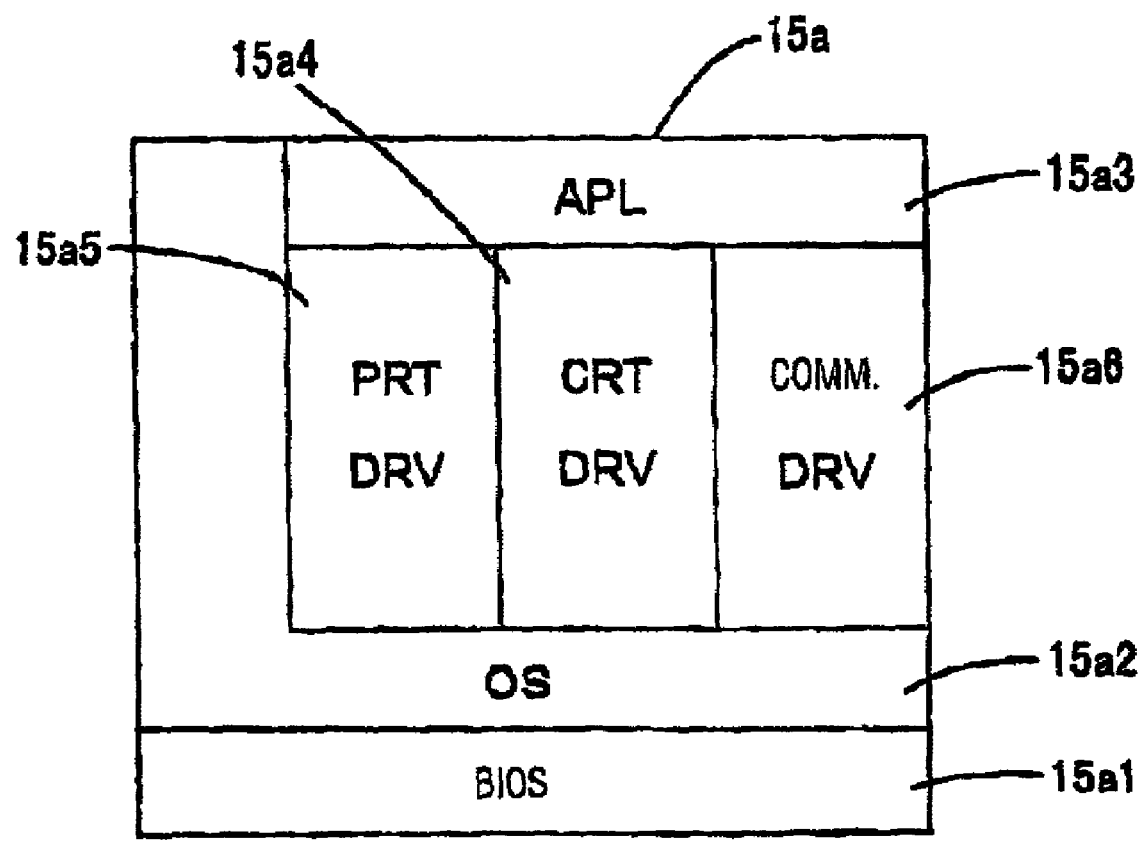
FIG. 2 is a diagram representing the organization of software stored in the hard disk of the computer.

On the basis of the above-described hardware configuration, the software suite stored in the hard disk 15a is executed on the computer 10 in the organized formation that is shown in FIG. 2. Specifically, on the above-described underlying hardware, BIOS 15a is executed, and over the BIOS layer, OS 15a2 and APL 15a3 are executed. In principle, the OS 15a2 accesses the hardware via the BIOS

15a1 or directly accesses the hardware and the APL 15a3 receives data from or transfers data to the hardware via the OS 15a2.

For example, if application software is to read data from the hard disk 15a, it must access the hardware via the OS 15a2. In addition, types of drivers for controlling the hardware are built in the OS 15a2 and they perform different control operations, forming part of the OS 15a2. The drivers in this embodiment: a display driver 15a4 for controlling the CRT interface 18, a printer driver 15a5, and a communication driver 15a6 for controlling the communication interface 21.

Figure 3:
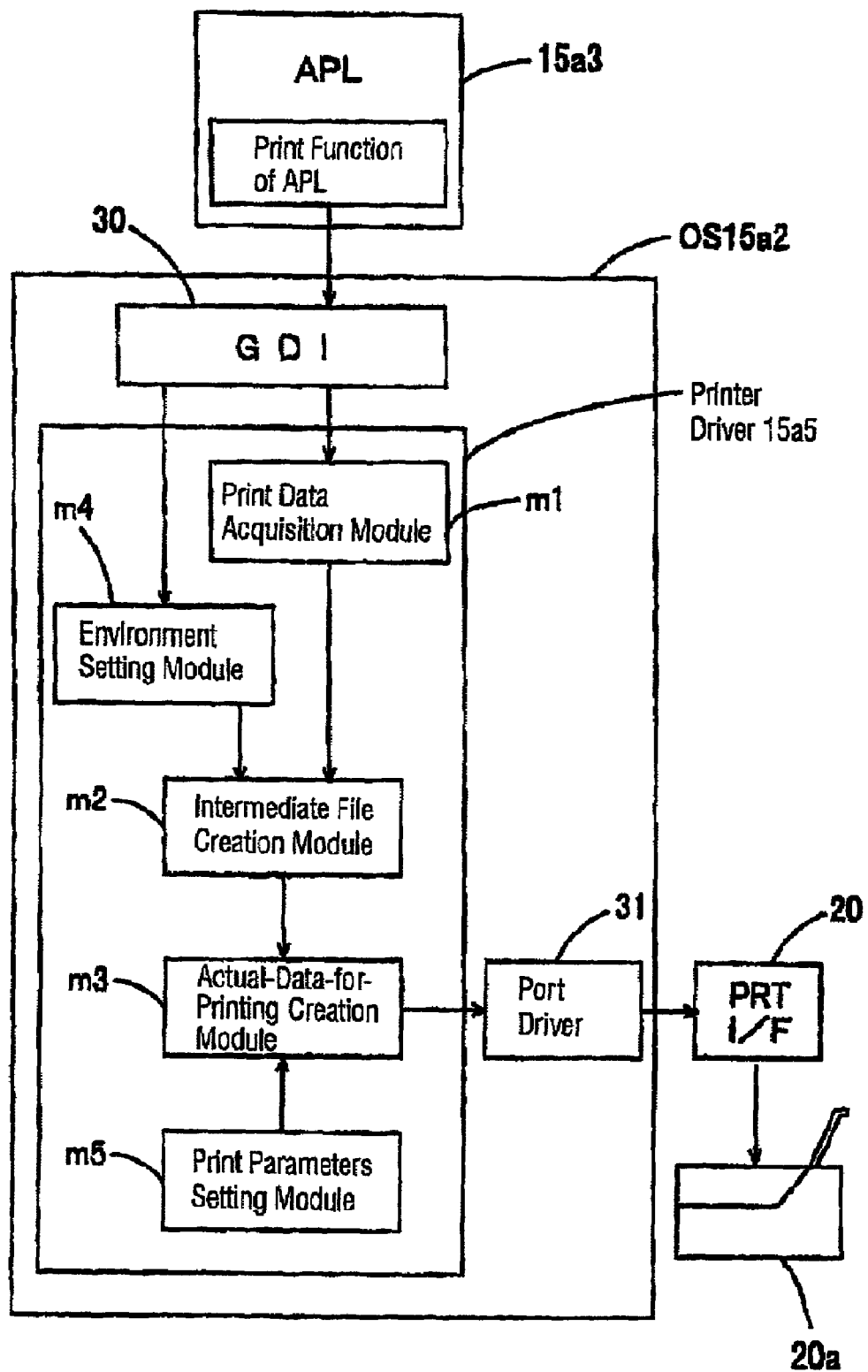
FIG. 3 is a block diagram representing the execution environment of a printer driver in which the print-control program in accordance with a preferred embodiment of the present is incorporated.

FIG. 3 is a block diagram representing the execution environment of the printer driver 15a5 in which the print-control program in accordance with a preferred embodiment of the present invention is incorporated.

The printer driver 15a5 is activated when the print function starts to run from the APL 15a3. The printer driver 15a5 is able to perform two-way communication with the printer 20a via the printer interface 20. The printer driver 15a5 controls the operation of receiving print data from the APL 15a3 via the OS 15a2, creating actual-data-for-printing, and sending it to the printer 20a. The OS 15a2 also incorporates GDI (Graphics Device Interface) 30 which provides a graphical user interface facility about graphics including image data such as drawings, pictures, etc. and text data. The OS 15a2 further incorporates a port driver 31 for sending actual-data-for-printing to the printer 20a. The actual-data-for-printing is created from an intermediate file or files stored into predetermined locations in the hard disk 15a, after the file contents are steped by predetermined steping.

The printer driver 15a5 is made up of a print data acquisition module m1, intermediate file creation module m2, actual-data-for-printing creation module m3, environment setting module m4, and print parameters setting module m5. The print data acquisition module m1 controls the operation to acquire print data created under the APL 15a3 from the GDI 30. The intermediate file creation module m2 controls the operation to create one or more intermediate files of the print data acquired under the control of the print data acquisition module m1 and temporarily store these files into the hard disk 15a. At this time, the intermediate file or files are created so as not to be so large beyond certain bounds to file size. The environment setting module m4 enables the hardware to receive a user-preference setting of the bounds to file size and fix on that setting as the bounds to file size, and supply the setting of the bounds to file size to the intermediate file creation module m2.

The port driver 31 enables the hardware to output the actual-data-for-printing created under the control of the actual-data-for-printing creation module m3 to the printer 20a and have the data printed by the printer 20a. The actual-data-for-printing creation module m3 controls the operation to properly retrieve the contents of the intermediate file or files temporarily stored into the hard disk 15a, execute image processing or the like in which RGB-based color data is converted to CMYK-based color data and create actual-data-for-printing that is output to the printer 20a. At this time, the actual-data-for-printing is created, based on various print parameters set under the control of the print parameters setting module m5. When the port driver 31 is activated, the actual-data-for-printing is output to the printer 20a.

(2) Simplified Structure of the Print-control Program

Figure 4:
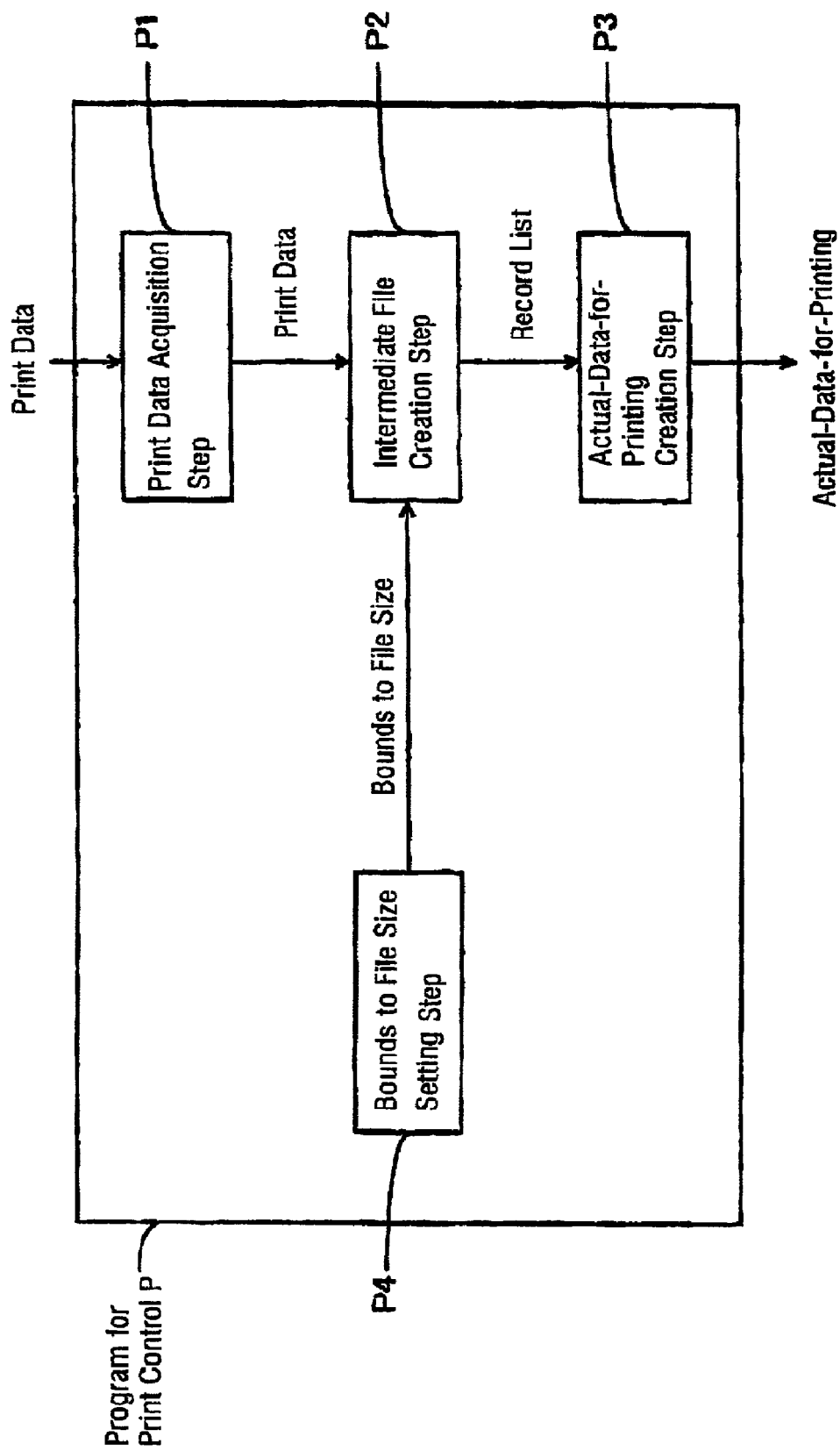
FIG. 4 is a diagram representing the simplified structure of the print-control program, the drawing corresponding with the principal claims appended

FIG. 4 is a diagram representing the simplified structure of the print-control program P in question incorporated in the printer driver 15a5, the drawing corresponding with the principal claims appended.

The print-control program P shown in FIG. 1 comprises a print data acquisition step P1, intermediate file creation step P2, actual-data-for-printing creation step P3, and bounds-to-file-size setting step P4. Having these components, the print-control program P operates as is outlined below. When the print data acquisition step P1 causes the hardware to acquire print data, the intermediate file creation step P2 causes the hardware to create one or more intermediate files of the print data acquired under the print data acquisition step P1. At this time, it is possible to divide the print data into parts of data amount that falls within certain bounds to file size and create a plurality of intermediate files of divisional print data. The thus created intermediate files are temporarily stored into the hard disk 15a.

The actual-data-for-printing creation step P3 causes the following hardware action: reading in turn the contents of one or more intermediate files temporarily stored in the hard disk 15a into the RAM 14, creating RGB bitmap data, according to the instructions to draw included in the intermediate files, and executing image processing or the like in which the RGB bitmap data is converted to CMYK-based color data, thus creating actual-data-for-printing. Upon receiving the actual-data-for-printing, the printer 20a can print on paper or the like from that data.

Figure 5:
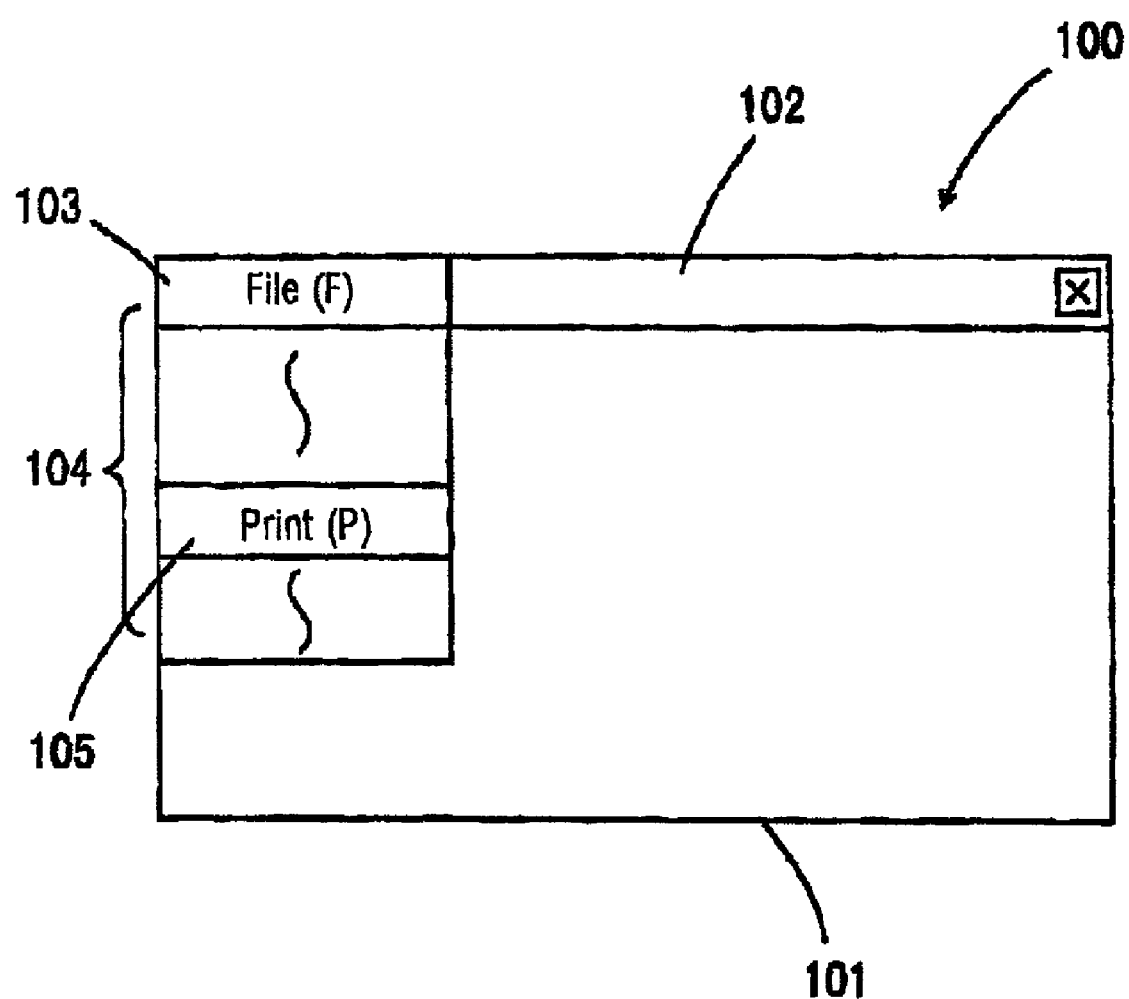
FIG. 5 is an illustration showing an exemplary operation window to be displayed by application software (APL), allowing the user to select the print function of APL.

(3) Data State Transition by Conversion from Print Data to Actual-data-for-printing The APL 15a3 features the print function of APL. When the print function of APL starts to run, the printer driver 15a5 calls the GDI 30 included in the OS 15a2 and displays a print interface window that allows the user to select or specify various print parameters. On the operation window 100 whose example is shown in FIG. 5, which is displayed by the APL 15a3, when label "File (F)" 103 shown at the left end on the top bar 102 in the window frame 101 is clicked with the mouse 18b, a pull-down menu 104 appears. Out of the pull-down menu, when "Print menu" 105 is clicked, the print function of APL is chosen and the print interface window, which is not shown, appears. The software to open this print interface window is the printer driver 15a5.

There is a print button on the print interface window. When this print button is clicked, the step of creating actual-data-for-printing starts.

Figure 6:
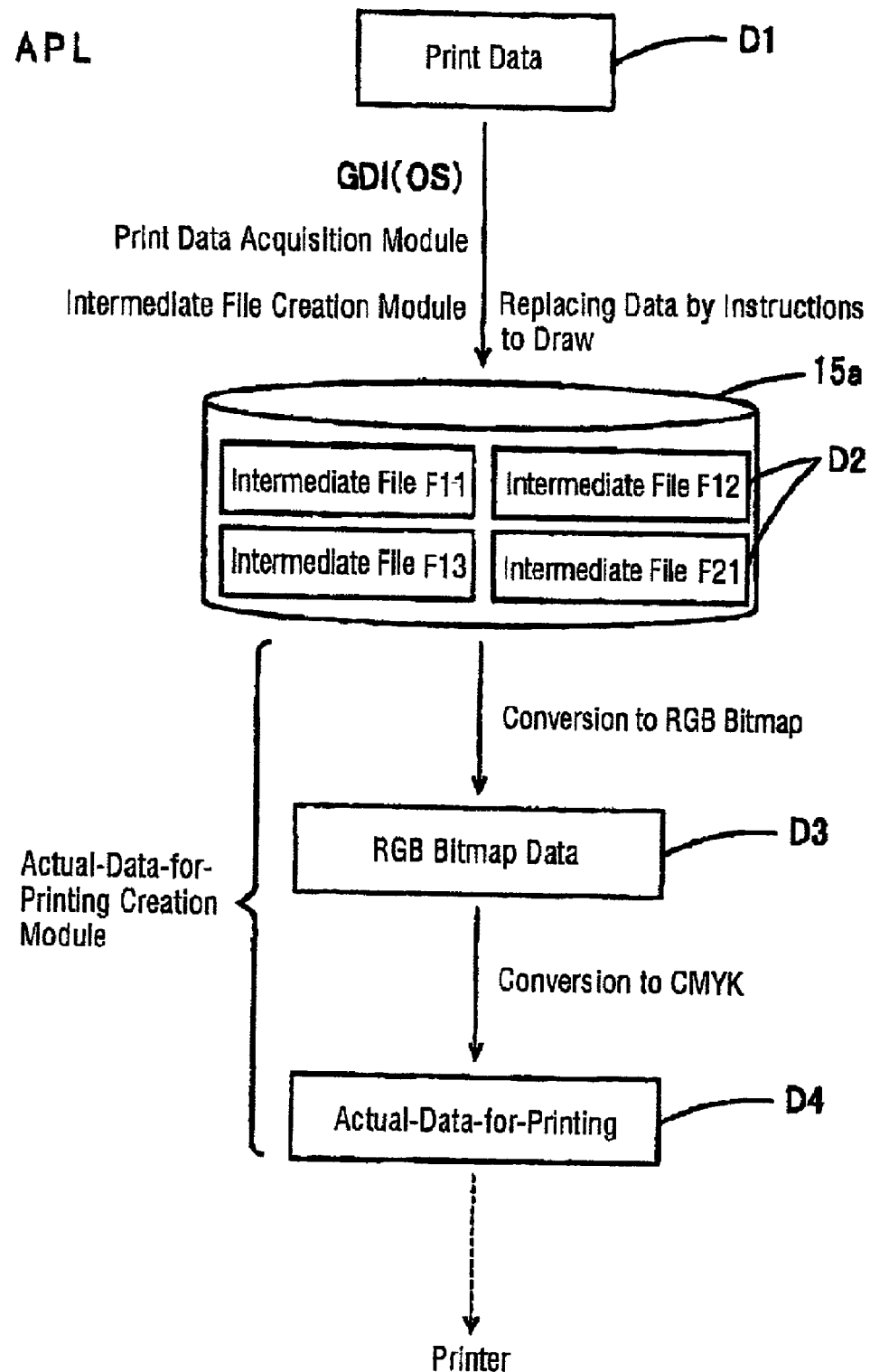
FIG. 6 is a flow diagram that schematically represents data state transition by conversion of print data created by APL to actual-data-for-printing.

FIG. 6 schematically represents data state transition by conversion of print data created by the APL 15a3 to actual-data-for-printing.

Print data D1 created by the APL 15a3 is a set of print commands from which actual-data-for-printing is to be created, according to predetermined rules. The print data D1 may be characters data primarily consisting of codes of characters, data primarily consisting of coordinates such as the coordinates of the origin and end of a line to draw or the like, or data primarily consisting of bitmap data. These characters data, data for lines or the like, bitmap data may be mixed together. The print data D1 includes other information such as size of paper on which page images will be printed, the orientation of print; i.e., page images will be printed on paper vertically (portrait) or horizontally (landscape), widths of margins, header information, etc.

Figure 7:
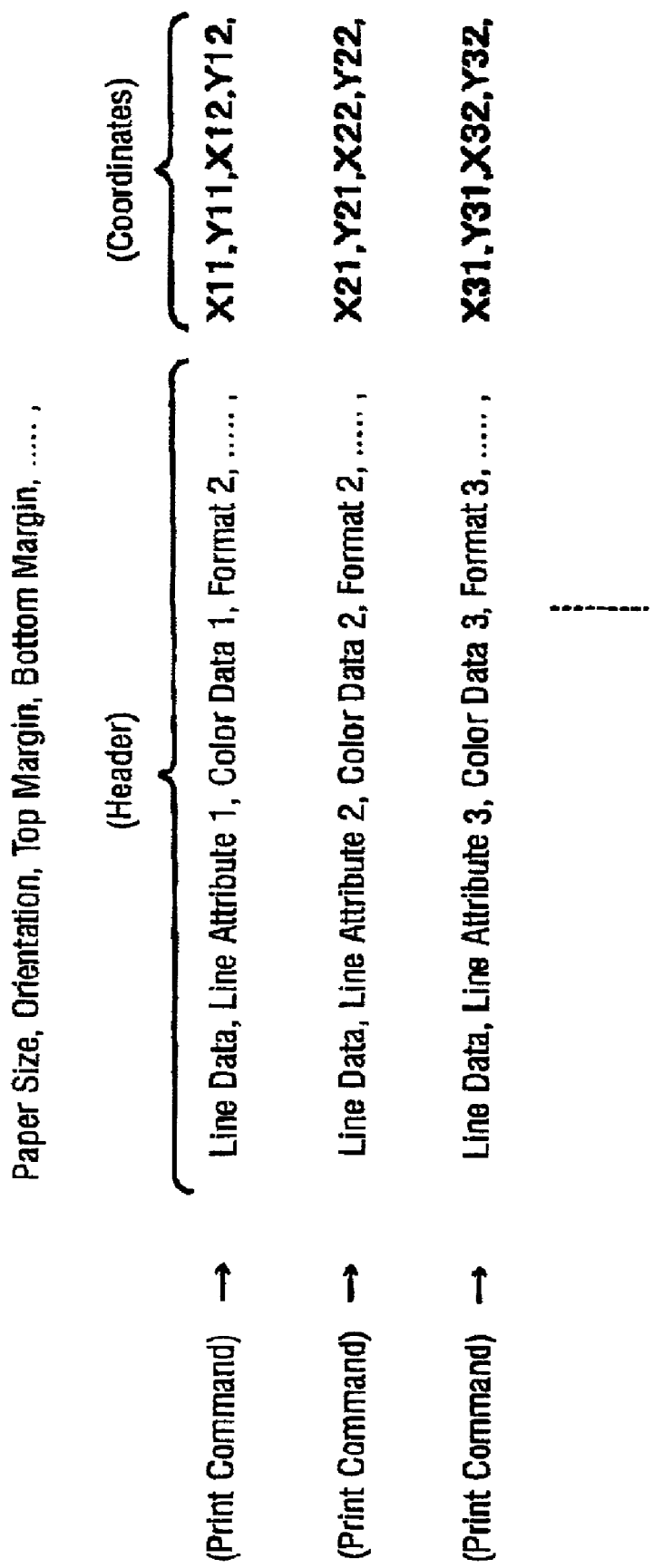
FIG. 7 shows an example of the composition of print data that consists of line data.

FIG. 7 gives an example of the composition of the print data D1 if the print data D1 is line data for drawing lines.

In FIG. 7, as the header of the print data D1, information such as size of paper, orientation, margins, etc. is placed at the beginning of the print data D1. Following this header, one or more print commands are sequentially placed. Each print command has its header including, as a first element, data type information indicating characters, lines or the like, bitmap, or other data as the data to which the print command pertains. When the data type is "line data" as shown, the header further includes "line attribute," "color data," "format," etc. To the "line attribute," specification such as straight line, a sequence of polygonal lines, rectangle, polygon, or the like may be assigned and a specific color of the specified lines such as straight line is specified as "color data." To the "format," specification such as solid line, dotted line, lines chained with a dot, line width, line end shape (for example, arrows), a pattern applied to a closed area (for example, paint solid), or the like may be assigned.

When the data type is "line data," the coordinates of the ends of a line follow the command headers. For example, if the coordinates of the origin of a line connecting two points are X11, Y11 and the coordinates of the end point are X12 and Y12, the coordinates X11, Y11, X12, Y12 are specified as data that follows the header.

Figure 8:
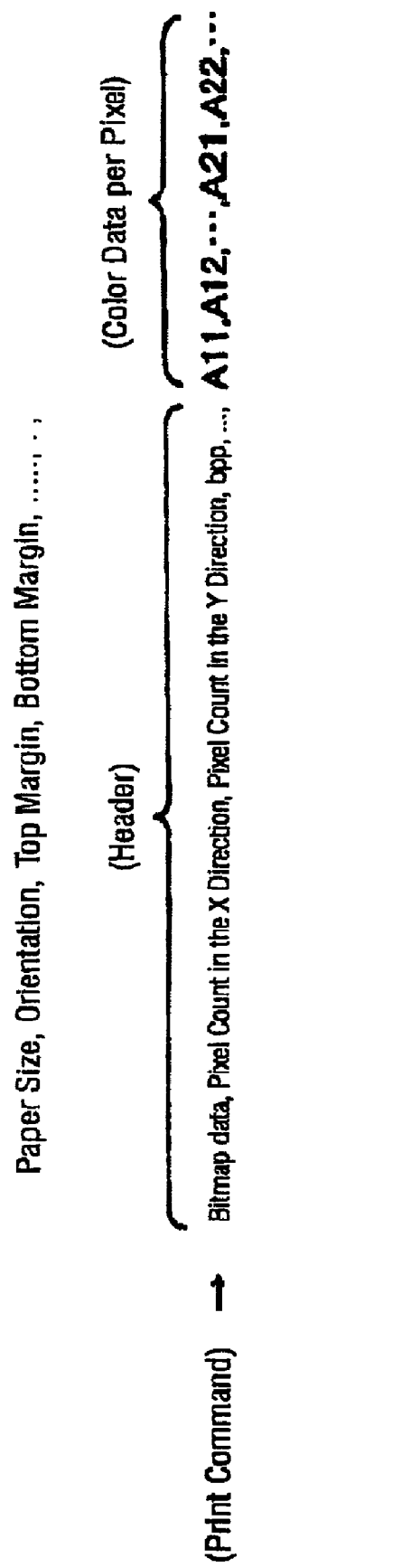
FIG. 8 shows an example of the composition of print data that consists of bitmap data.

Another composition of the print data D1 if the print data D1 is assumed to be data primarily consisting of bitmap data is, for example, as shown in FIG. 8.

In FIG. 8, the information as the header of the print data D1 is the same as for the line data example. Following this header, one or more print commands are placed; one print command in this example given in FIG. 8. The header of the print command includes information such as "bitmap data" as data type, "pixel count in the x direction" indicating horizontal bitmap extent, "pixel count in the y direction" indicating vertical bitmap extent, "bpp" indicating the bit count per pixel, etc. To the "bpp," a numerical value such as 1, 4, 8, 16, 24, 32, etc. may be assigned.

Following the command header, a sequence of color data specified for the pixels of bitmap is placed. An example of the color data arrangement for the pixels which are element units of bitmap data is shown in FIG. 9. In this example, color data items such as A11, A12, A13, . . . etc. are respectively assigned to the pixels on the top line from the left to the right end. Similarly, color data items such as A21, A22, A23, . . . etc. are respectively assigned to the pixels on the second line and color data items such as A31, A32, A33, . . . etc. to the pixels on the third line, so that the color data items for all pixels will be arranged in a matrix.

The bits used to represent each color data such as A11, A12, . . . or the like will be equal to the bit count assigned to "bpp." If bitmap data is generated by assigning color values of R, G, and B that are set from the R, G, and B color ranges of 256 tone colors to each pixel, eight bits are required to represent each of the R, G, and B values. Thus, the "bpp" value is 24 and each color data item consists of 24 bits, that is, 3 bytes.

The number of color data items in the bitmap will be equal to the product of multiplication of the "pixel count in the x direction" by the "pixel count in the y direction."

In some case, the print data D1 may be compressed bitmap data. In this case, following the sequence of color data such as A11, A12, . . . etc., a reference table is provided for the reference to color attributes or the like.

The print data D1 created by the APL 15a3 is delivered via the GDI 130 to the printer driver 15a5 and replaced by instructions to draw that are intermediate code to be stored into one ore more intermediate files. The print data acquisition module m1 of the printer driver 15a5 has the duty of controlling the computer 10 to acquire the print data D1 and the intermediate file creation module m2 of the printer driver 15a5 has the duty of controlling the computer 10 to replace the print data D1 by the instructions to draw. The instructions to draw are composed of various units to draw and the intermediate file creation module m2 replaces each print command-by the corresponding unit to draw and creates one or more intermediate files D2. The structure of an intermediate file D2 is similar to the structure of the print data D1." Specifically, for the print data D1 consisting of bitmap data in the example shown in FIG. 8, the print command included within it is replaced by the corresponding unit to draw. The unit to draw includes the contents of the print command header such as "bitmap data" indicating bitmap data print instructions, "pixel count in the x direction," "pixel count in the y direction," "bpp," etc. and the sequence of color data per pixel. For the print data D1 consisting of line data in the example shown in FIG. 7, its print commands are replaced by a plurality of corresponding units to draw.

When one or more intermediate files D2 are created under the control of the intermediate file creation module m2, if necessary, the print data as the instructions to draw that replaced the previous print data is divided into parts of data amount falling within certain bounds to file size and the intermediate files D2 of divisional print data are created. If the print data comprises a plurality of pages to print, it is divided so that page-by-page printing can be performed and the intermediate files D2 of divisional print data are created. For example, assume that an intermediate file of print data of 1 gigabytes (GB), or 1024 megabytes (MB) must be created, according to the conventional method wherein the intermediate file is not divided. In the present preferred embodiment of the invention, the same amount of print data can be handled as follows. If the bounds to file size are set at 256 MB, the print data is divided into at least four intermediate files because 1024/256=4.

The thus created intermediate file or files D2 are temporarily stored into the hard disk 15a. If the print data is divided into a plurality of intermediate files D2, the plurality of intermediate files D2 are temporarily stored into the hard disk 15a.

The contents of the temporarily stored intermediate file or files D2 are read in turn by the printer driver 15a5 into the RAM 14 and converted into RGB bitmap data D3. Then, actual-data-for-printing D4 is created. The actual-data-for-printing creation module m3 of the printer driver 15a5 has the duty of controlling the computer 10 to create the actual-data-for-printing D4 from the intermediate file of files D2. Under the control of the actual-data-for-printing creation module m3, the contents of the intermediate files D2 are read in turn into the RAM 14; that is, simultaneous reading of the two or more files into the RAM does not occur. Based on the instructions to draw included in the intermediate files D2, conversion to bitmap data is executed, thereby creating RGB bitmap data D3.

Figure 10:
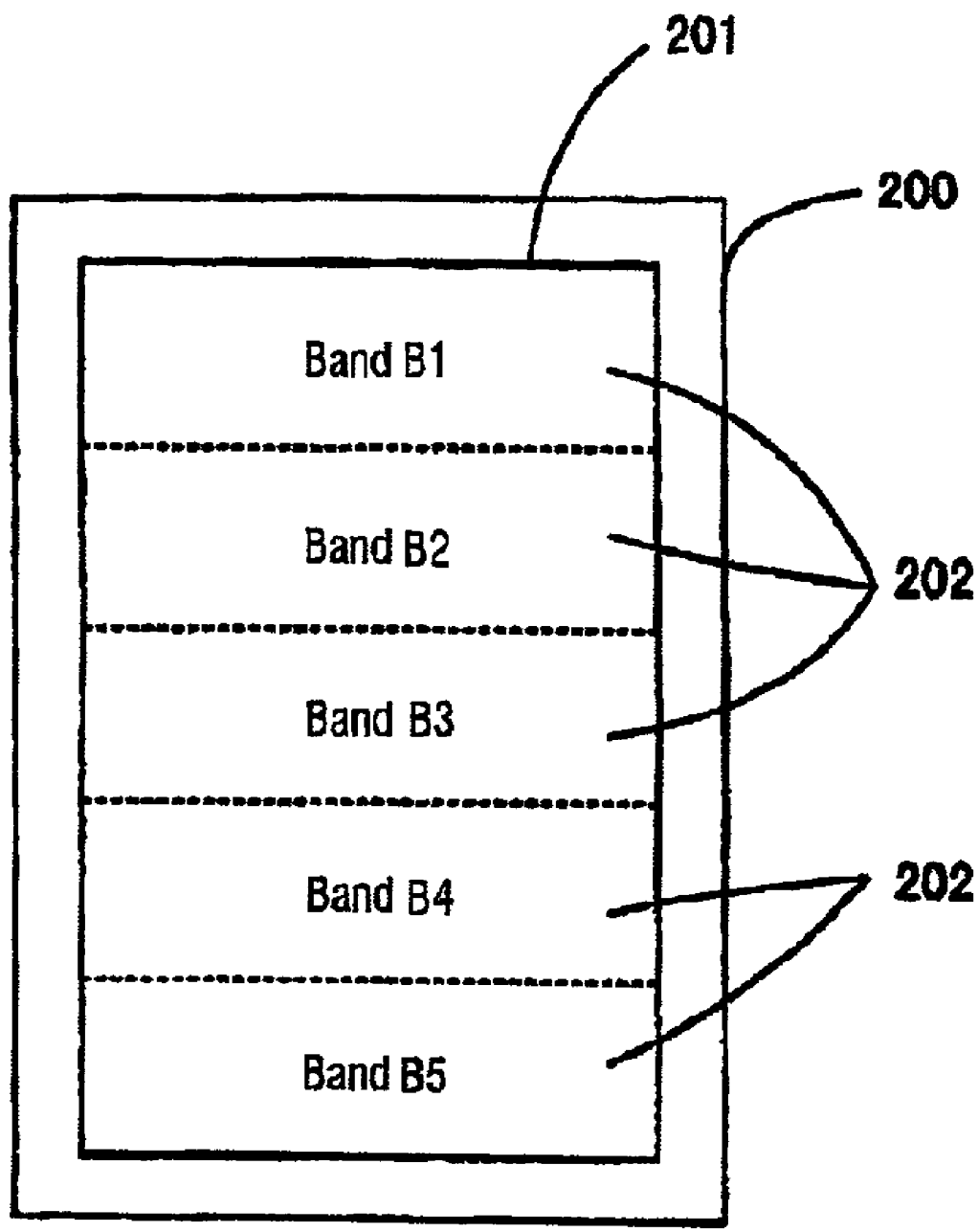
FIG. 10 shows bands as zones into which page print area is partitioned.

Because the printer 20a used in the present preferred embodiment is assumed a large type, the following printing manner is taken; if page images are printed on paper, page print area 201 within which a page is printed on paper 200 is partitioned into a plurality of zones which are referred to as bands 202 as is shown in FIG. 10. Thus, a plurality of pieces of RGB bitmap data D3 corresponding to the bands 202 are created under the control of the actual-data-for-printing creation module m3.

Figure 11:
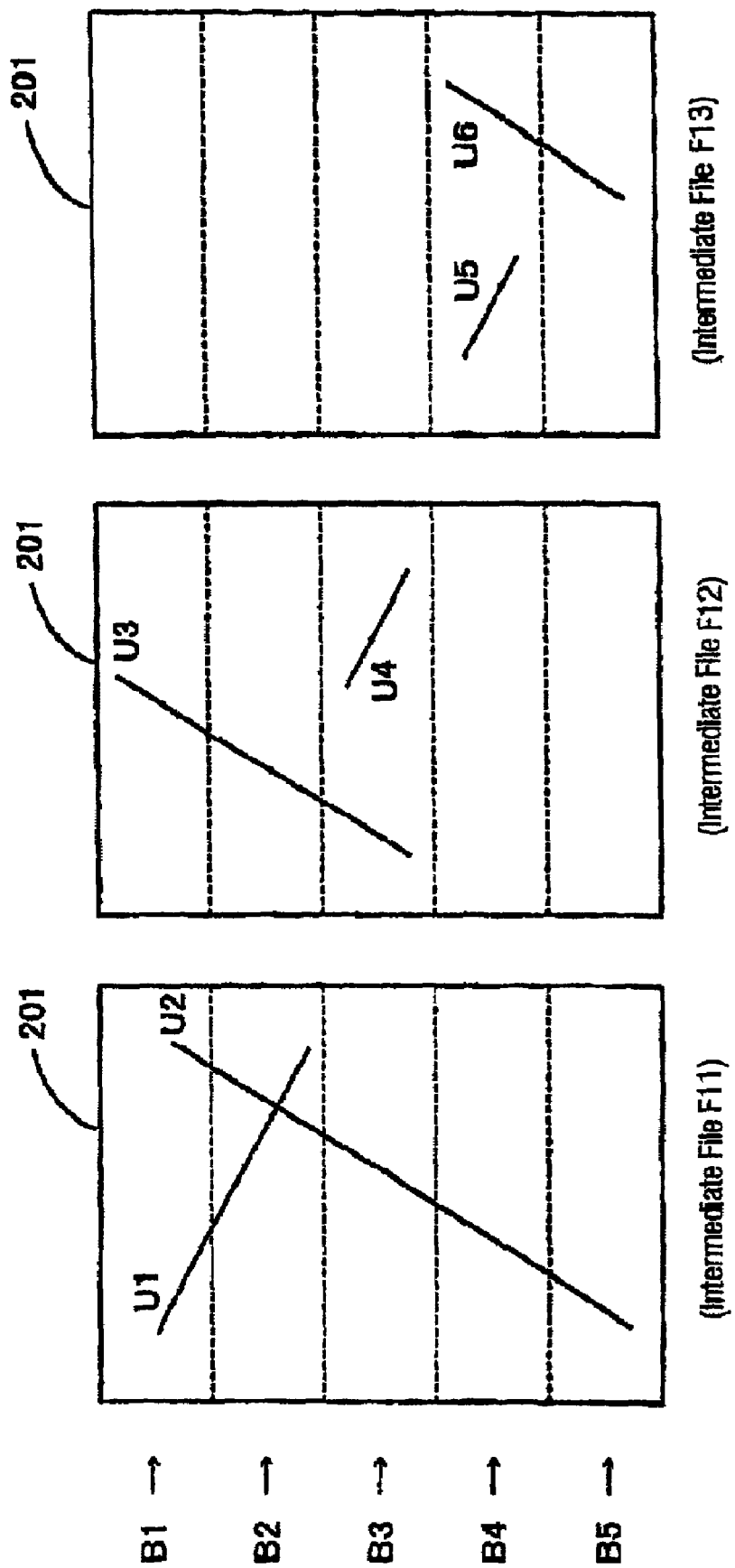
FIG. 11 is an illustration that schematically shows page print area partitioned into zones where lines are printed, based on line data units to draw, including page aspects provided for each intermediate file.

Hereon, under the control of the actual-data-for-printing creation module m3, a record list is created in which the above intermediate files are corresponding to a plurality of bands 202 so that reference can be made to the intermediate files D2 corresponding to the bands 202. For example, assume the following: the print data D1 is a set of line data, units to draw U1 to U6 by which straight lines are printed within the print area 201 shown in FIG. 11 are divided into three, and three intermediate files F11 to F13 of divisional print data are created as is shown in FIG. 12. Then, a record list R1 as is shown in FIG. 13 is created. To make it easy to understand, the units to draw U1 to U6 shown in FIG. 11 are grouped under the three intermediate files F11 to F13 into which they are divided. For the intermediate files shown in FIG. 12, their headers are omitted for simplifying purposes. The addresses (in hexadecimal notation) given in FIG. 12 are the starting addresses of the units to draw U1 to U6. The address space in which an individual unit to draw is stored is, for example, "00140000" to "004100FF" (for the unit to draw U1).

The addresses specified in FIG. 12 are virtually assigned addresses that are used for the intermediate file creation module m2 and the actual-data-for-printing creation module m3 to handle the units to draw. These addresses do not always agree with the addresses on the RAM 14. In the present preferred embodiment, to make it easy to understand the explanation, however, it is assumed that these addresses where the units to draw are stored correspond to the addresses on the RAM 14. The following explanation will be made based on this assumption.

The record list R1 lists the addresses where the units to draw are stored, wherein the addresses are sorted by the bands B1 to B5. Address registration into the record list will be exemplified below. For the unit to draw U1 stored at address "00410000" in the intermediate file F11, the U1 is drawn across bands B1 and B2. Thus, the address "00410000" is double-registered for both bands "B1" and "B2" in the record list R1. For the unit to draw U2 stored at address "00410100," the U2 is drawn across all bands B1 to B5. Thus, the address "00410100" is multi-registered for all bands in the record list R1. For the unit to draw U4 stored at address "18524000" in the intermediate file F12, the U4 is drawn only in band B3. Thus, the address "18524000" is registered only for band "B3" in the record list R1.

Figure 14:
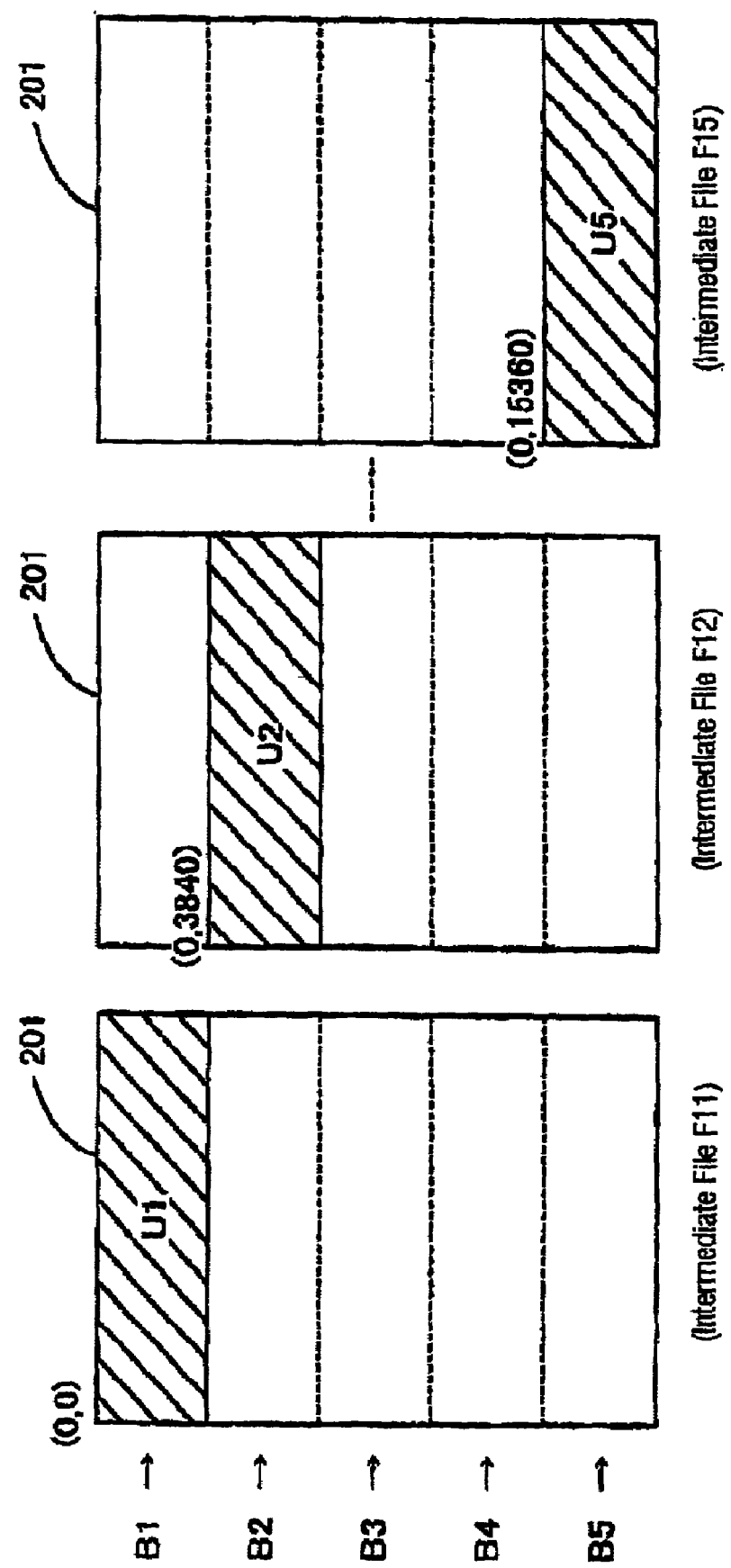
FIG. 14 is an illustration that schematically shows page print area partitioned into zones where bitmap is printed, based on bitmap data units to draw, including page aspects provided for each intermediate file.
Figure 15:
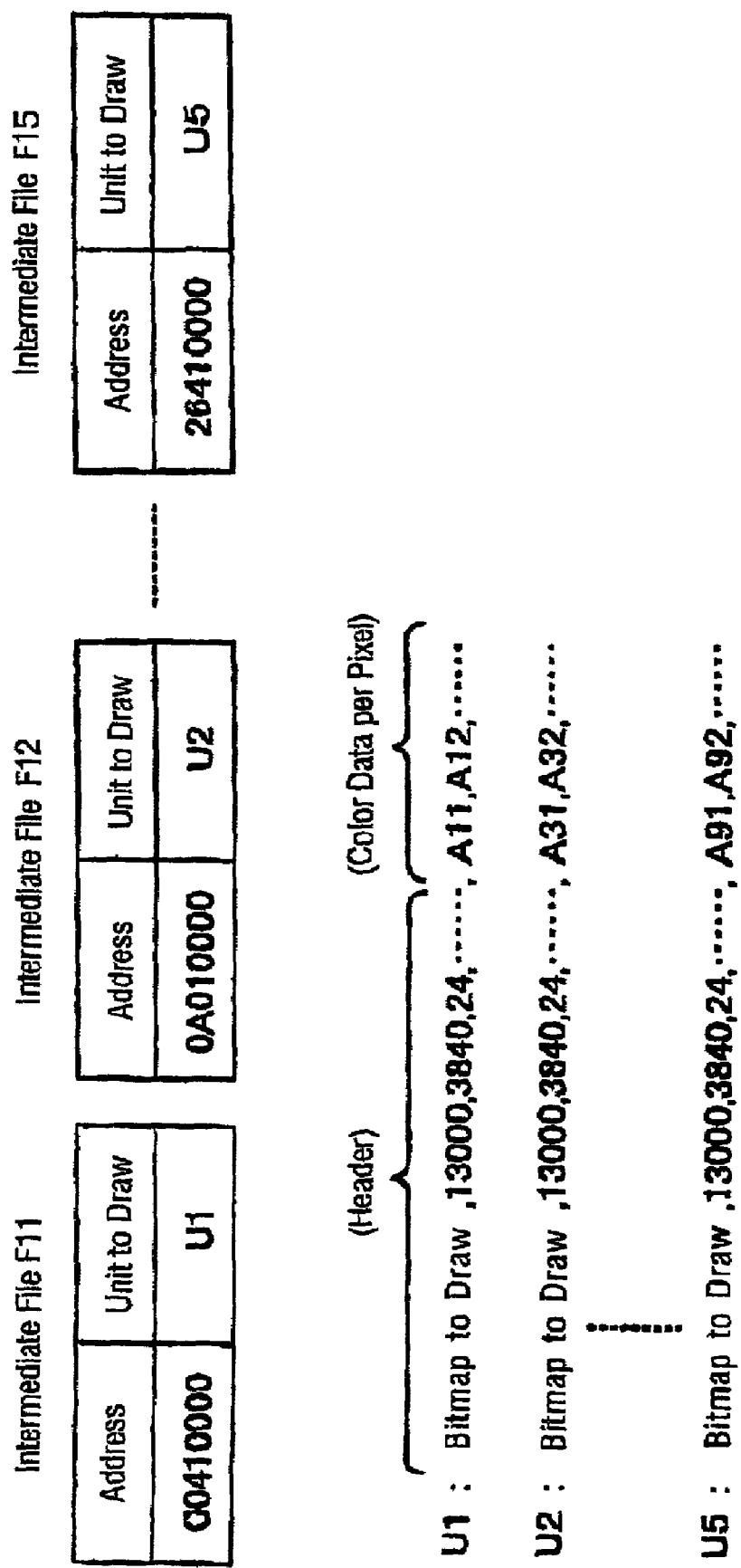
FIG. 15 is an illustration that exemplifies the contents of the created intermediate files of divisional print data.
Figure 16:
FIG. 16 is an illustration that exemplifies the contents of a record list.

If the print data D1 is one bitmap data, it is divided as is exemplified in FIG. 14 and replaced by units to draw U1 to U5. Then, five intermediate files F11 to F15 are created so that each file will contain each unit to draw U1 to U5 as is shown in FIG. 15. In this case, a record list R1 as is shown in FIG. 16 is created. For the unit to draw U1 stored at address "00410000" in the intermediate file F11, the U1 is drawn only in band B1. Thus, the address "00410000" is registered only for band "B1" in the record list R1. For the unit to draw U2 stored at address "0A410000" in the intermediate file F12, the U2 is drawn only in band B2. Thus, the address "0A410000" is registered only for band "B2" in the record list R1.

Under the control of the actual-data-for-printing creation module m3, following the creation of RGB bitmap data D3, conversion from the RGB bitmap data to CMYK bitmap data is executed, using a color conversion table called LUT, and actual-data-for-printing D4 is created as the data to be supplied to the printer 20a. During this step, a plurality of pieces of actual-data-for-printing D4 are created, each corresponding to each of RGB bitmap data D3 from the files. Based on the created plurality of pieces of actual-data-for-printing D4, the printer 20a can print object images per band 202.

If the print data D1 is CMYK bitmap data, the conversion to CMYK-based color data need not be executed in the step flow shown in FIG. 6. If the print data D1 is data of JPEG format or the like, such a manner may be taken that the data is directly sent to the printer 20a without the execution of conversion to RGB bitmap and conversion to CMYK-based color data and the data is converted to CMYK on the printer 20a immediately before the execution of print.

Figure 17:
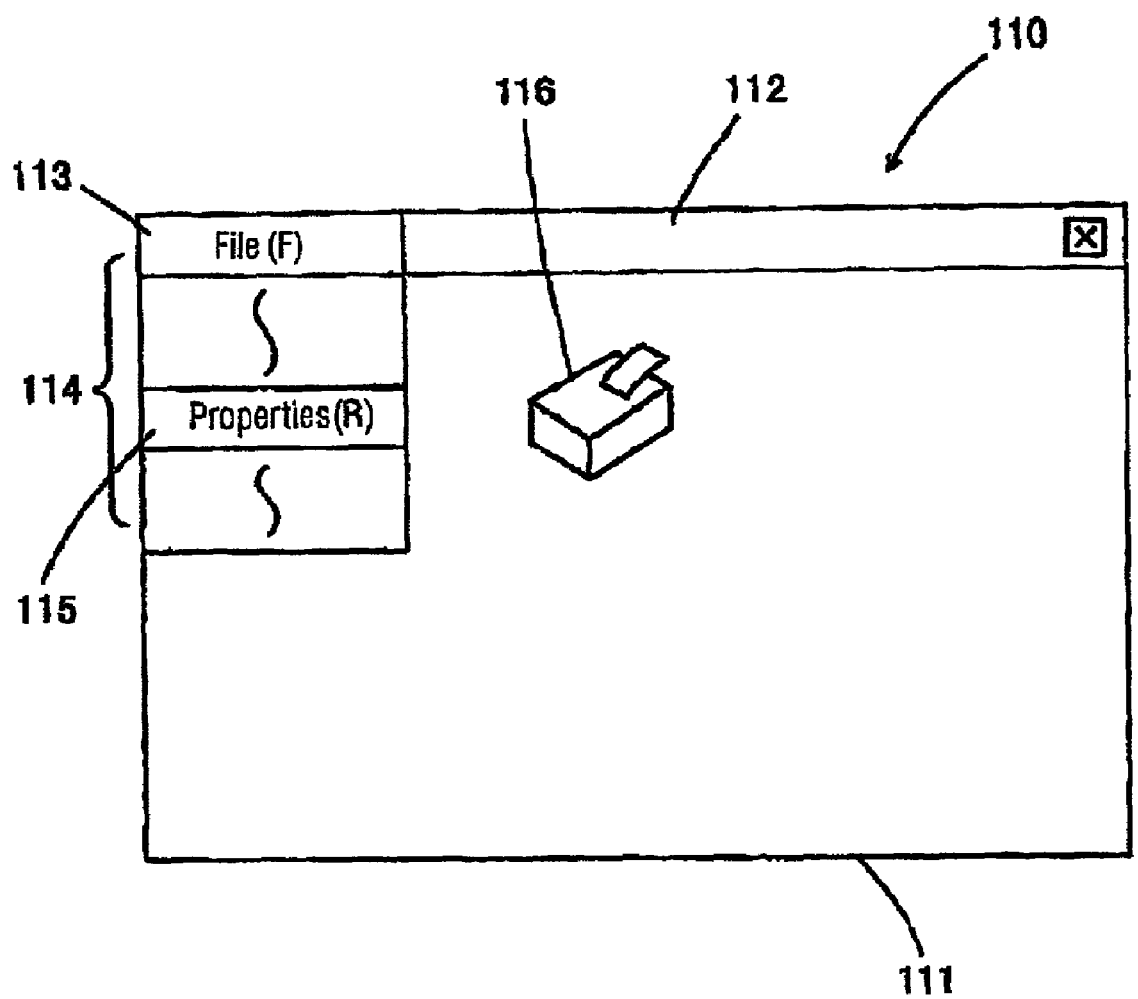
FIG. 17 is an illustration showing an exemplary operation window to be displayed by OS, allowing the user to select an environment setting function.
Figure 18:
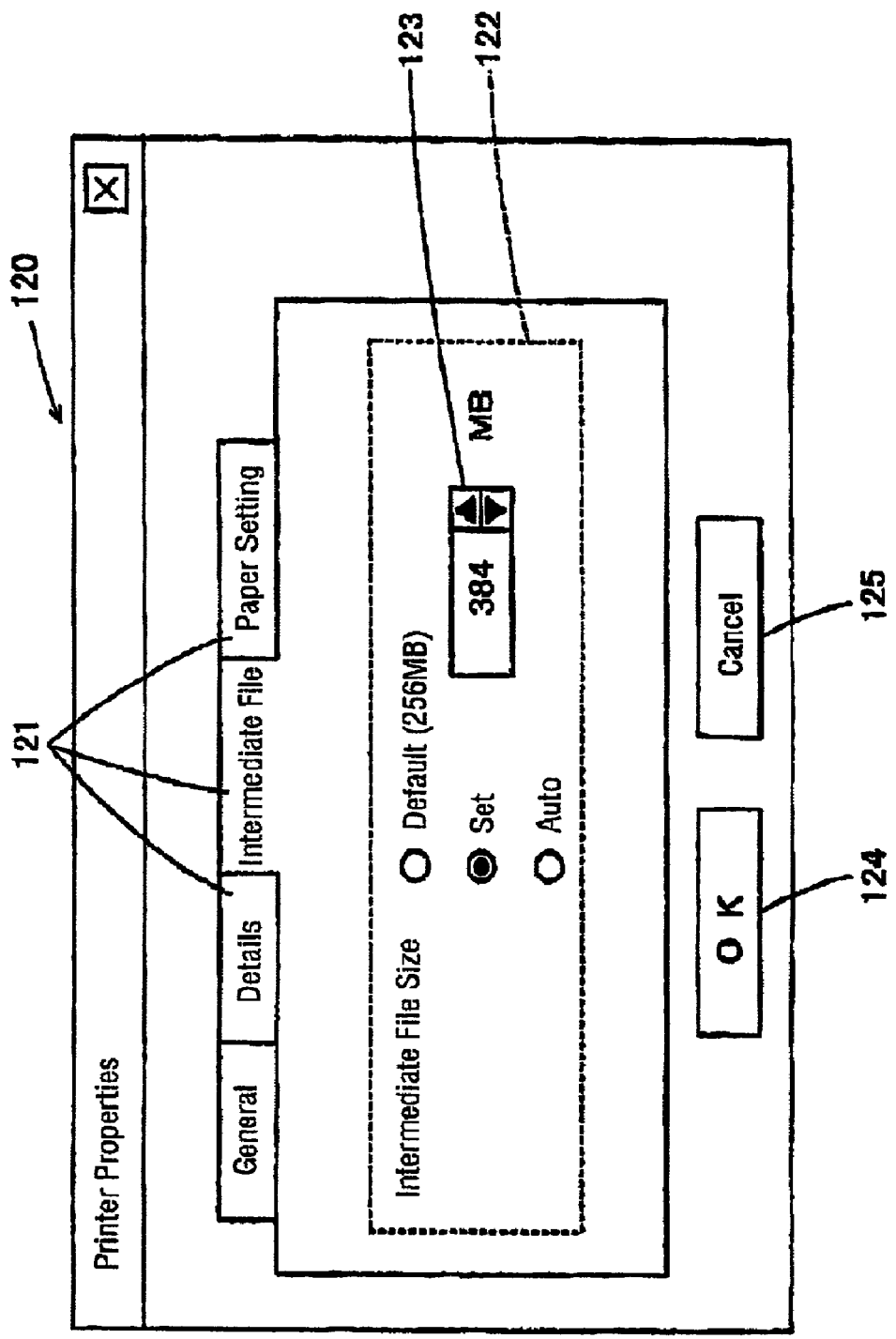
FIG. 18 is an illustration showing an exemplary properties setting window.

By the way, the OS 15a2 has an environment setting function. When this environment setting function is activated, the printer driver 15a5 calls the GDI 30 included in the OS 15a2 and displays a Properties setting window that allows the user to select or specify various parameters about print operation. On the operation window 110 whose example is shown in FIG. 17, which is displayed by the OS 15a2, after a printer icon 116, pictorial representation of printer, is clicked with the mouse 18b, when label "File" 113 shown at the left end on the top bar 112 in the window frame 111 is clicked, a pull-down menu 114 appears. Out of the pull-down menu, when "Properties menu" 115 is clicked, the environment setting function is chosen and a Properties setting window 120 whose example is shown in FIG. 18 opens. The software to open the Properties setting window 120 is the printer driver 15a5.

On the upper side of the Properties setting window 120, a plurality of tabs 121 are present as options of items for which the parameters can be customized or verified. In the window example shown in FIG. 18, it is assumed that an "Intermediate File" label tab 121 has been chosen with the mouse 18b. On the window, an Intermediate File Size selection box 122 is present with the OK button 124 and the Cancel button 125 being provided at the bottom.

The Properties setting window 120 can be arranged such that the user can choose whether to create intermediate files during the execution of print operation. If the user chooses not to create intermediate files, no intermediate files are created. However, while print operation is executed under the control of the printer driver 15a5, the user input to the computer 10 is disabled. In consequence, if the print data size is huge, the user cannot use the computer 10 for rather long time.

In the Intermediate File Size selection box 122, options "Default," "Customize," and "Auto" with radio buttons are present. The user can choose one of these options by turning its radio button on. If "Default" is chosen, the above-mentioned bounds to file size, that is, the maximum intermediate file size is set at the default value, for example, 256 MB.

If "Customize" is chosen, the user can specify the bounds to file size by entering a value in the entry field 123 for intermediate file size with the mouse 18b or keyboard 18a. The bounds to file size are set as specified in the entry field 123 for intermediate file size.

If "Auto" is chosen, the bounds to file size are determined, according to the free space in the RAM 14 into which the contents of the intermediate files are read in turn.

When the OX button 124 or the Cancel button 125 is clicked, the Properties setting window 120 is closed and the user returns to the operation window 100. If the OK button 124 is clicked, the setting that the user has just entered in the Intermediate File size selection box 122 is set valid. If the cancel button 125 is clicked, the entered setting is canceled.

(4) Printer Driver Component Modules

Figure 19:
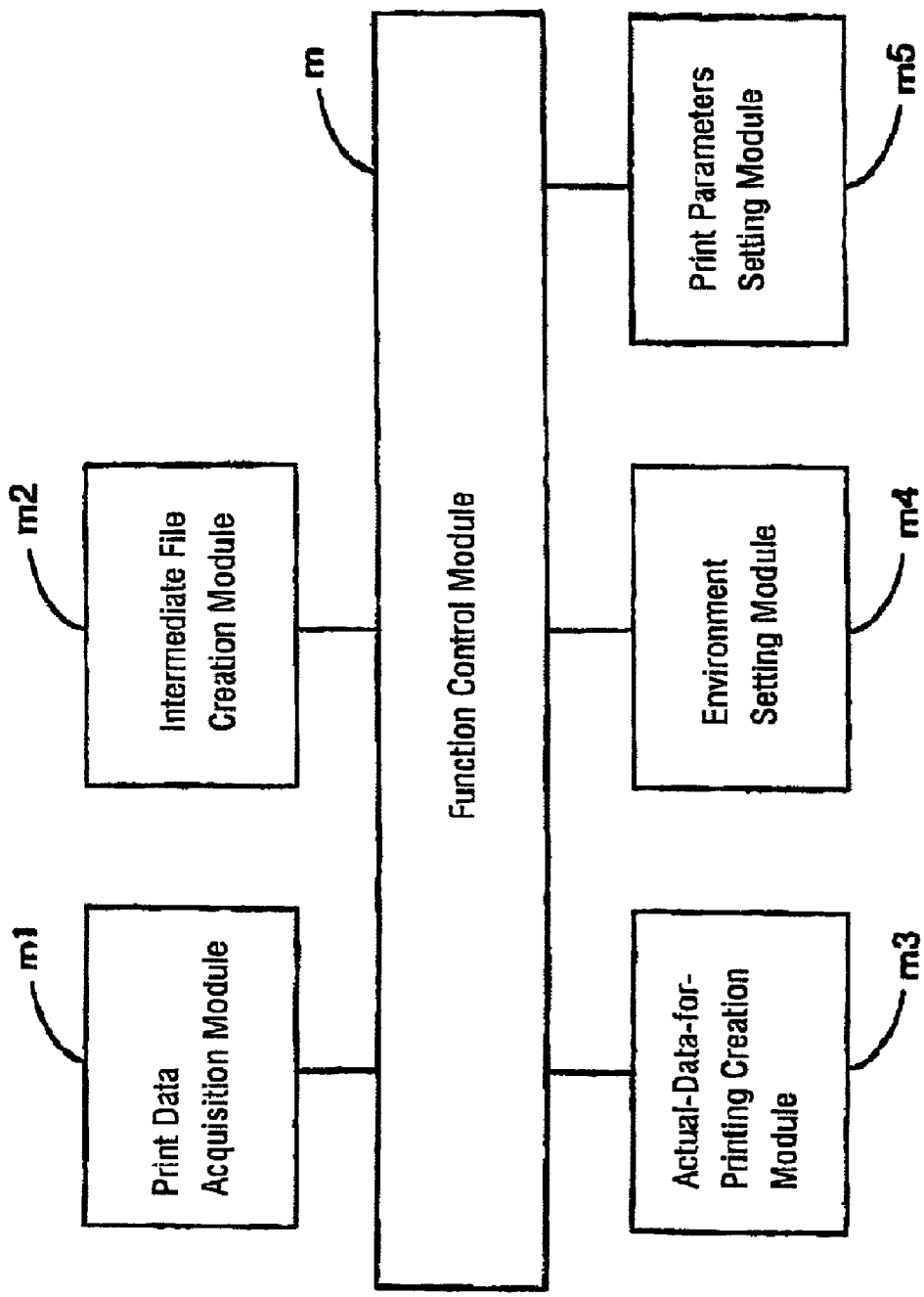
FIG. 19 is a block diagram showing the printer driver configuration comprised of modules.

FIG. 19 is a block diagram showing the functional components of the printer driver 15a5 that carries out print operation control as described above. The printer driver 15a5 further includes a function control module m besides the above-described modules m1 to m5. The role of the function control module m is controlling the operation of these modules m1 to m5. Based on the control of the function control module m, the modules m1 to m5 can fulfill their specific functions and work together to create actual-data-for-printing.

The print data acquisition module m1 controls the operation to acquire print data created under the APL 15a3 via the GDI 30. In fact, the print data acquisition module m1 runs the print data acquisition step P1 of the print-control program, thereby causing the computer 10 to acquire print data.

The printer driver 15a5 is called by the OS 15a2 on request and one of its duties is creating intermediate files. The interface for this duty is the intermediate file creation module m2. In fact, the intermediate file creation module m2 runs the intermediate file creation step P2 of the print-control program, thereby causing the computer 10 to create intermediate files.

The actual-data-for-printing creation module m3 controls the operation to read the contents of the intermediate files in turn and create actual data of bitmap to print. In fact, the actual-data-for-printing creation module m3 runs the actual-data-for-printing creation step P3 of the print-control program, thereby causing the computer 10 to perform the above operation.

The graphical user interface for allowing the user to input various parameters about the environment setting for print operation is controlled by the environment setting module m4. The duty of this module includes the control of operation to receive a user-preference setting of the bounds to file size and fix on that setting as the bounds to file size. In fact, the environment setting module m4 runs the bounds-to-file-size setting step P4, thereby causing the computer 10 to perform that operation.

The graphical user interface for displaying a certain window allowing the user to input desired parameters about print operation is controlled by the print parameters setting module m5. In the present preferred embodiment, the print parameters setting module m5 runs a part of the actual-data-for-printing creation step P3 of the print-control program, thereby causing the computer 10 to perform steping for such interface.

(5) Operation of the Preferred Embodiment

This subsection explains a sequence of operations that the print-control program comprised of the above-mentioned steps causes the computer 10 to perform in the present preferred embodiment.

Figure 20:
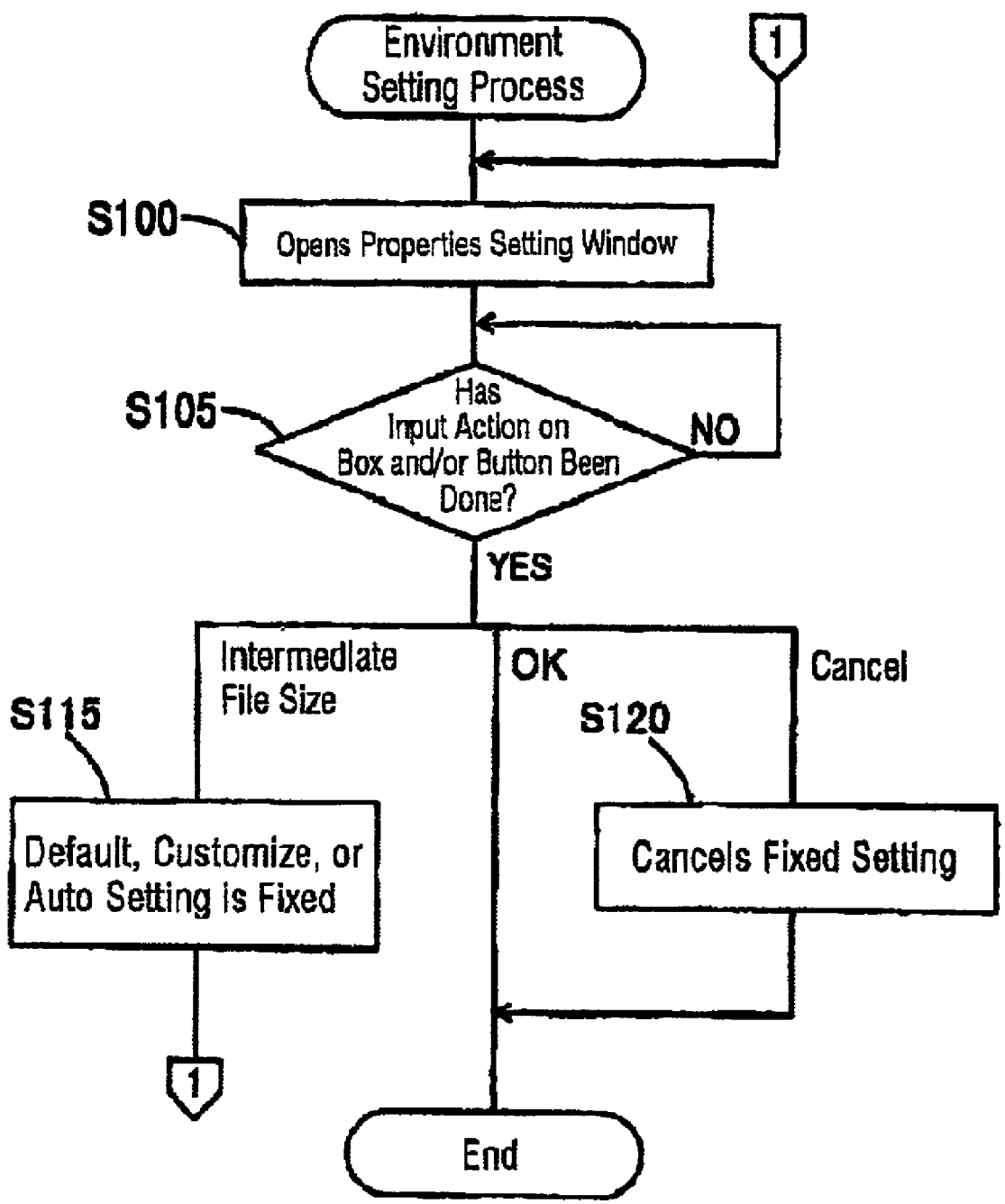
FIG. 20 is a flowchart outlining an environment setting step that is executed under the control of an environment setting module of the printer driver.

FIG. 20 is a flowchart outlining an environment setting step that the computer 10 executes under the control of the printer driver 15a5. The following explanation is based on the actual operation procedure.

When the OS 15a2 executes a command to open "Properties menu" 115, the function control module m activates the environment setting module m4 that, in turn, opens the Properties setting window 120 shown in FIG. 18 (step S100). On the window, the default setting may be on or the last set value may be present in the Intermediate File Size selection box 122. Steps for determining what tab 121 is clicked and opening the window for the clicked tab 121 are executed, though not included in the flowchart shown. It is assumed that the "Intermediate File" tab 121 has been clicked. Then, judgment is made as to whether user input action has been done; that is, the user has selected or specified any setting in the box 122 and/or clicked the OK 124 or Cancel 125 button with the mouse 18b and keyboard 18a (step S105). Unless the user-input action has been done, the operation is looped back to the step S105 until action has been done.

When it is judged that any action has been done in the step S105, the next step to be executed differs for the entry box 122, OK button 124 and Cancel button 125.

If it is judged in the step S105 that the user selected or specified any setting in the Intermediate File Size selection box 122, the "Default," "Customize," or "Auto" option about the bounds to file size is fixed, according to the user selection (step S115). If the "Customize" option is selected, the value entered in the entry field 123 for intermediate file size is received and this specified value is fixed as the bounds to file size. Operation returns to the step S100 and the radio button of the selected option is turned on.

When the OK button 124 is clicked, the setting is fixed and this step flow terminates. Then, the Properties setting window 120 disappears and the user returns to the operation window 100 displayed by the OS 15a2.

On the other hand, when the Cancel button 125 is clicked, the fixed setting out of the Intermediate File Size selection box 122 is canceled (step S120) and the step flow terminates. The Properties setting window 120 disappears and the user returns to the operation window 100.

The bounds-to-file-size setting step P4 is program code written to cause the hardware to receive a user-preference setting of the bounds to file size and fix on that setting as the bounds to file size in the way described above, Its function is implemented by the execution of the step comprising the steps S100 to S120.

Figure 21:
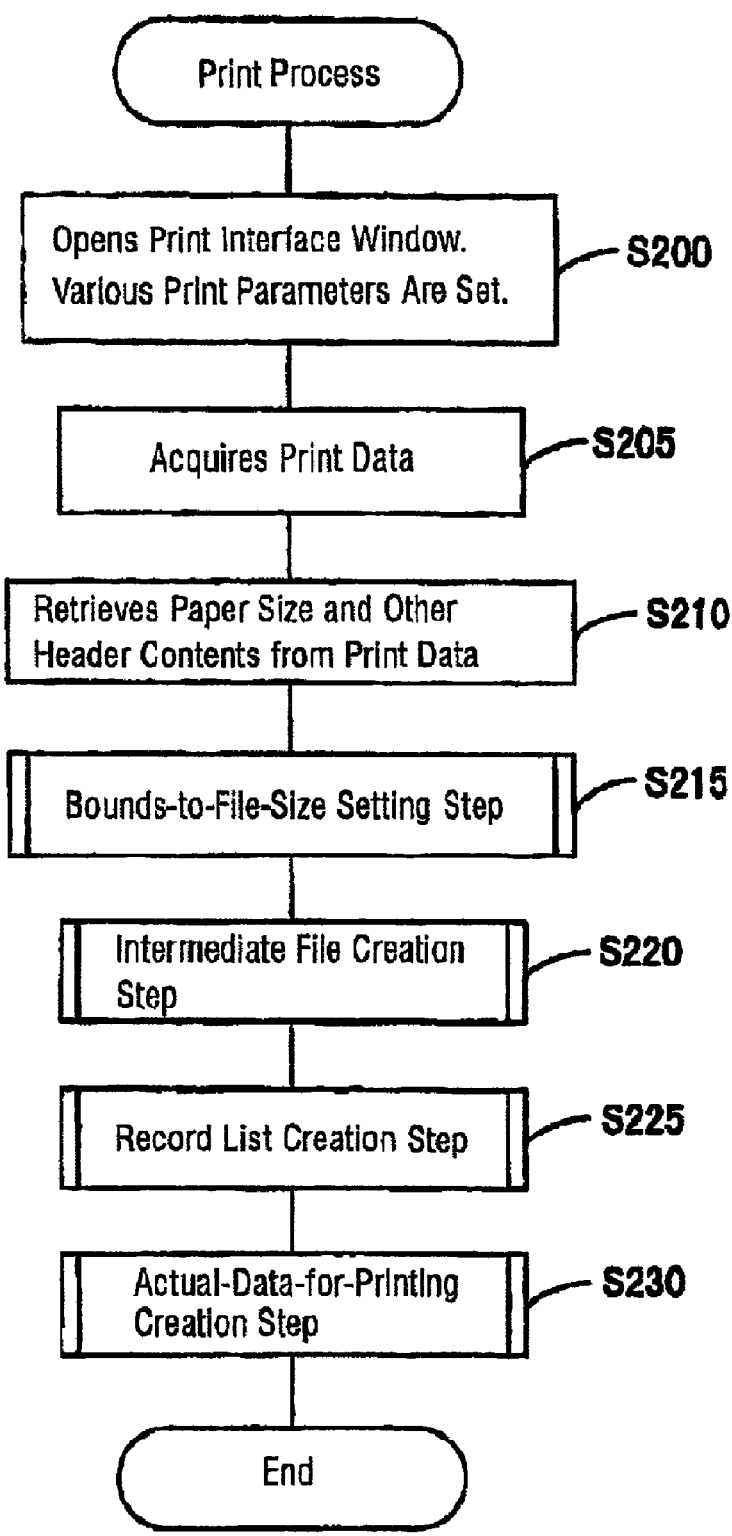
FIG. 21 is a flowchart outlining a print step that the computer executes under the control of the printer driver.

FIG. 21 is a flowchart outlining a print step that the computer 10 executes under the control of the printer driver 15a5.

When the APL 15a3 executes a command to open "Print menu" 105, the function control module m activates the print parameters setting module m5 that, in turn, opens the print interface window, which is not shown, allowing the user to input various print parameters, and the parameters are set (step S200). The print parameters to be set include paper type, paper orientation, start and end pages of print, number of copies, etc.

When the print button, which is not shown, provided on the print interface window is clicked, the function control module m activates the print data acquisition module m1, under the control of which print data created by the APL 15a3 is acquired via the GDI 30 (step S205). In fact, the print data acquisition step P1 of the program of the present invention is run and its function is implemented by the execution of the step S205.

After the acquisition of print data, the intermediate file creation module m2 is activated. Under the control of the module m2, the contents of the print data header such as paper size, orientation, top and bottom margins, etc., as shown in FIGS. 7 and 8, are retrieved (step S210). Bounds to file size are set by the execution of step, bounds-to-file-size setting (step S215) which will be detailed later. Intermediate files are created by the execution of step, intermediate file creation (step S220). Then, a record list is created by the execution of step, record list creation (step S225). Finally, actual-data-for-printing is created by the execution of step, actual-data-for-printing creation (step S230).

Figure 22:
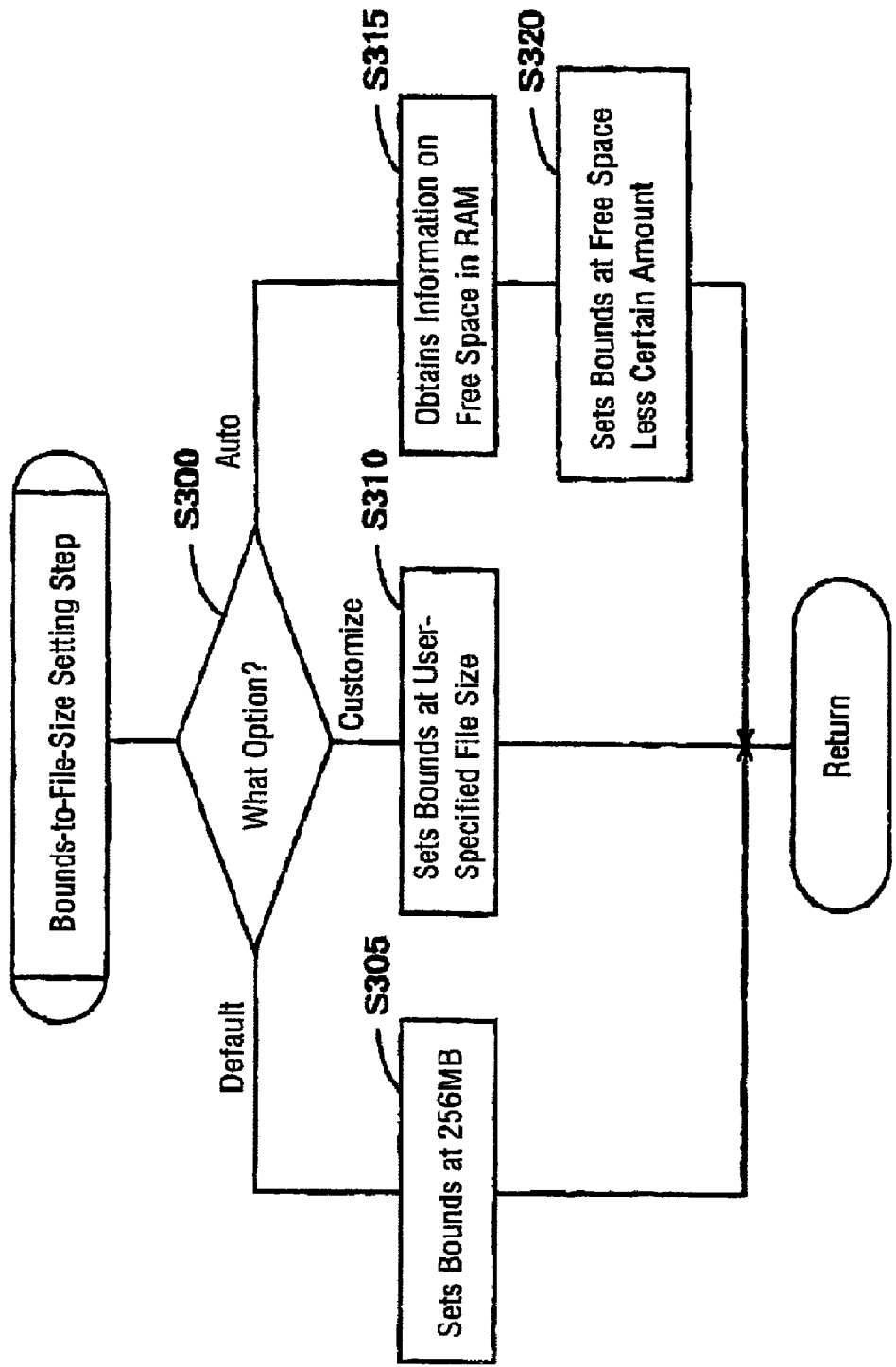
FIG. 22 is a flowchart outlining a bounds-to-file-size setting step that is executed under the control of an intermediate file creation module of the printer driver.

FIG. 22 is a flowchart outlining the bounds-to-file-size setting step that is carried out in the above-mentioned step S215. This step flow is executed by the computer 10 under the control of the intermediate file creation module m2.

Refer to FIG. 22 where the step first branches, depending on the option of the bounds to file size that has been fixed, after selected or specified in the Intermediate File Size selection box 122 on the Properties setting window 120 (step S300). If "Default" has been fixed out of the Intermediate File Size selection box 122, the bounds to file size are set at predetermined size of 256 MB (step S305) and this step flow terminates.

If "Customize" has been fixed, the bounds to file size are set at the file size specified in the entry field 123 for intermediate file size (step S310) and this step flow terminates. According to the example given in FIG. 18, the bounds to file size are set at "384 MB."

If "Auto" has been fixed, by querying the OS 15a2 about free space in the RAM 14, the information on free space is first obtained (step S315). The OS 15a2 is provided with a function for finding how much space is free in the RAM 14 and outputting the information thereof. By calling this function, the printer driver 15a5 can obtain the information on free space amount in the RAM 14 into which the contents of the intermediate files will be read in turn after created.

Then, the bounds to file size are set at the thus obtained free space amount less a certain amount (step S320) and this step flow terminates. The certain amount to be deducted from the free space amount is set so that sufficient working area for print operation steping will be available when the intermediate files are read in turn into the RAM, according to the environment of the computer 10. If, for example, the certain amount is "32 MB" and the free space amount in the RAM 14 is "416 MB," the bounds to file size are set at "384 MB," the result of subtracting "32 MB" from "416 MB."

In this way, the bounds to file size may be set at predetermined size, user-specified size as received by the bounds-to-file-size setting step P4, or determined, according to the free space in the RAM 14.

Figure 23:
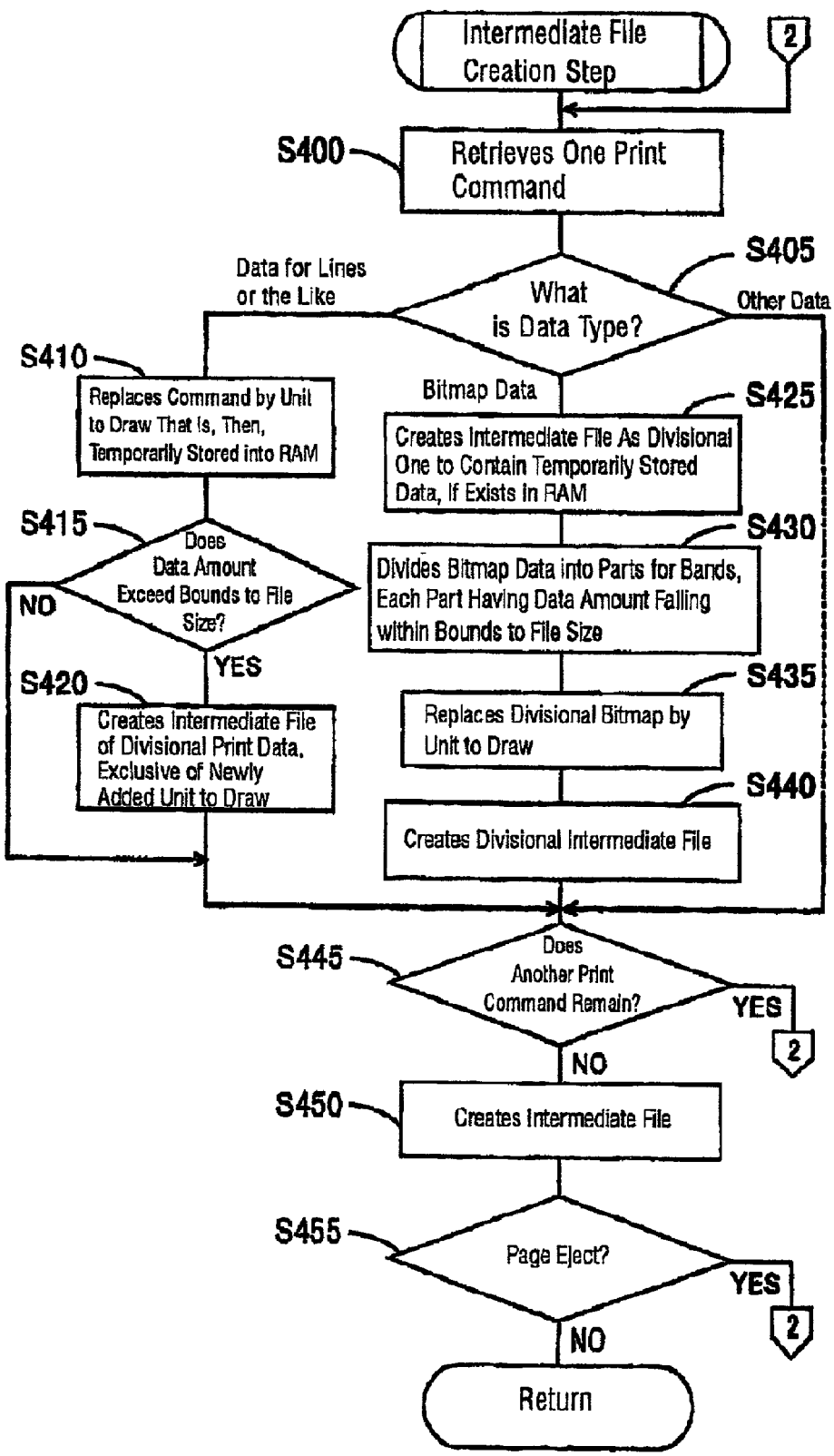
FIG. 23 is a flowchart outlining an intermediate file creation step that is executed under the control of the intermediate file creation module.

FIG. 23 is a flowchart outlining the intermediate file creation step that is carried out in the above-mentioned step S220. This step flow is also executed by the computer 10 under the control of the intermediate file creation module m2. In this step flow, intermediate files are created page by page to print and print data is divided into intermediate files to fall within the certain bounds to file size.

When the bounds to file size are set, first, one command is retrieved from the acquired print data (step S400). The data type is read from the print command header and the step branches. according to the data type (step S405). If the data type is data for lines or the like such as, typically, the line data example given in FIG. 7, replacing the print command by a unit to draw and subsequent steping are carried out in steps S410 to S420 and the operation goes to step S445. If the data type is bitmap data such as the example given in FIG. 8, replacing the print command by a unit to draw and subsequent steping are carried out in steps S425 to S440 and the operation goes to step S445. If the data type is data other than the data for lines or the like and the bitmap data, replacing the print command by a unit to draw and subsequent steping are carried out in sequence which is, however, not included in the flowchart shown, and the operation goes to step S445.

Figure 24:
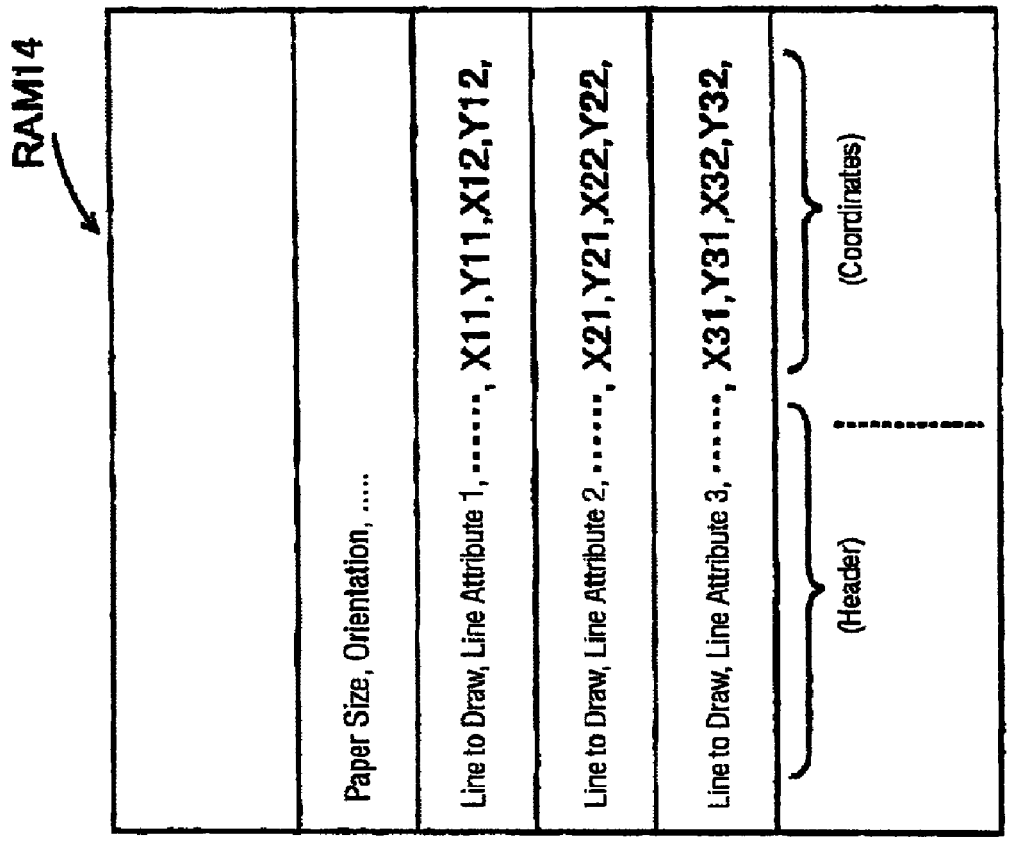
FIG. 24 is an illustration showing the state of units to draw temporarily stored into RAM after print commands are replaced by the units to draw.

If the data type specified in the print command is data for lines or the like, the print command is first replaced by a unit to draw that is then temporarily stored into the RAM 14 as is exemplified in FIG. 24 (step S410). When the unit to draw is temporarily stored, if one or more units to draw have been previously stored there after replacement, the unit to draw is added to the previous one or ones.

The structure of a unit to draw is similar to the structure of a print command. Refer to the print command examples given in FIG. 7. The contents of the header of a print command such as "line data," "line attribute 1," "color data 1," "format 1," etc. corresponds to "line to draw," "line attribute 1, " "color data 1," "format 1," etc. in a unit to draw. The coordinates such as "X11, Y11, X12, Y12" included in the print command are also as is in the unit to draw.

Then, judgment is made as to whether the data amount as the sum of the print data header and the temporarily stored units to draw exceeds the bounds to file size (step S415). According to the example given in FIG. 18 where the bounds to file size are set at "384 MB," whether the total data amount of the print data header and the units to draw is greater than "384 MB" is judged. If the data amount does not exceed the bounds to file size, the operation skips step 420 and goes to step 445.

If the data amount exceeds the bounds to file size, an intermediate file of divisional print data is created, exclusive of the unit to draw newly added as the replacement (step S420). For the data examples shown in FIG. 24, if, for example, the data amount as the sum of the print data header and the units to draw U1, U2 and U3 exceeds the bounds to file size, an intermediate file not including the data of the unit to draw U3 is created. Consequently, an intermediate file F11 as shown in FIG. 11 is created. The data of the unit to draw U3 remains on the RAM 14. The created intermediate file is temporarily stored into the hard disk 15a and the operation goes to step S445.

In the step S445, judgment is made as to whether another print command remains as part of the acquired print data (step S445). If another print command remains, the steps S405 to S440 are carried out again. If the print data is a data set for lines or the like, this loop creates another intermediate file of divisional print data to contain the print data header plus the data of temporarily stored units to draw within the bounds to file size.

Unless there is another print command, an intermediate file of the print data header plus the data of temporarily stored units to draw is created and the created intermediate file is temporarily stored into the hard disk 15a (step S450). If one or more intermediate files of divisional print data have been created in the step 420, an intermediate file of divisional print data is also created in the step S450. In consequence, intermediate files F11 to F13 as shown in FIG. 12 are created.

Then, judgement is made as to whether there is a page eject code in the acquired print data (step S455). If there is a page eject code, it indicates that other print commands remain in the print data, and then the steps S400 to S455 are carried out again. This loop of step flow creates intermediate files page by page to print. Unless there is a page eject code in the acquired print data, no other print commands remain in the print data. Then, this step flow terminates.

If the data type judgment of print command is bitmap data in the step S405, subsequent operation is as follows. First, an intermediate file is created as a divisional one to contain temporarily stored data of units to draw if such data exists on the RAM and the created intermediate file is temporarily stored into the hard disk 15a (step S425). The purpose of executing this step S425 is to separate the bitmap data from other data and create intermediate files for bitmap only if print data is the one in which different data types are mixed.

Then, the acquired bitmap data is divided into parts for bands 202, each part having the data amount falling within the bounds to file size (step S430) The parts into which the bitmap data is divided is determined as follows: the amount of the bitmap data is divided by the number of bands 202 (five in the present preferred embodiment); the quotient is further divided by the bounds to file size, wherein a point fraction is rounded up; and the quotient is multiplied by the number of bands 202.

For the print data example consisting of bitmap data shown in FIG. 8, for example, 24 bits, 13000 pixels, and 19200 pixels are assigned to the parameters "bpp," "pixels in the x direction," and "pixels in the y direction," respectively. If the coordinates of the origin are (0, 0) in units of pixels, the amount of the bitmap data exclusive of the header is 13000×192000×24/8/1024/1024=714 MB. Given the bounds to file size of 256 MB that is default setting, the calculation of bitmap division, wherein the amount of the header data is ignored to make it easy to understand, is as follows. "714 MB" is divided by "5" as the number of bands 202, then, a quotient of "143 MB" is obtained. "143 MB" is divided by "256 MB" as the bounds to file size, then, a quotient of "0.6" is obtained and rounded up to "1." "1" is multiplied by "5" as the number of bands 202, then, "5" is obtained. Thus, the bitmap data of 714 MB/5=143 MB, that is, the bitmap data is divided into five parts of 143 MB.

In the example shown in FIG. 14, because the page of bitmap data is vertically divided, for all divided bitmap data, the "pixels in the x direction" remains being "13000" pixels and the "pixels in the y direction" are "3840" pixels, that is, "19200" divided by 5. For the coordinates of the origin, only the y coordinate value shifts in steps of "3840" pixels; that is, (0, 0), (0, 3840), ..., (0, 15360), as shown in FIG. 14.

If a reference table for the reference to color attributes or the like is provided, following the color data per pixel such as A11, A12, . . . etc., a part of the reference table for divisional bitmap is converted.

Then, each divisional bitmap data is replaced by unit to draw (step S435). A divisional intermediate file is created for each unit to draw and the created intermediate file is temporarily stored into the hard disk 15a (step S440) Sequentially, intermediate files F11 to F15 as shown in FIG. 15 are temporarily stored into the hard disk 15a.

Then, the operation goes to step S445 and judgment is made as to whether another print command remains as part of the acquired print data (step S445). If another print command remains, the steps S405 to S440 are carried out again.

If the data type judgment of print command is other than the data for lines or the like and the bitmap data in the step S405, replacing the print command by a unit to draw and subsequent steping are carried out in sequence which is, however, not included in the flowchart shown, and the operation goes to step S445. Then, the above-described steps S445 to S455 are carried out.

The intermediate file creation step P2 is program code written to cause the hardware to be able to divide the print data acquired under the print data acquisition step P1 into parts of data amount falling within certain bounds to file size and create a plurality of intermediate files of divisional print data in the way described above. Its function is implemented by the execution of the steps S210 to S220, S300 to S320, and S400 to S455. When the print data is bitmap data, the intermediate file creation step P2 enables the hardware to generate a plurality of bitmap data for divisional zones corresponding to bands of bitmap and create intermediate files for each divisional bitmap.

Figure 25:
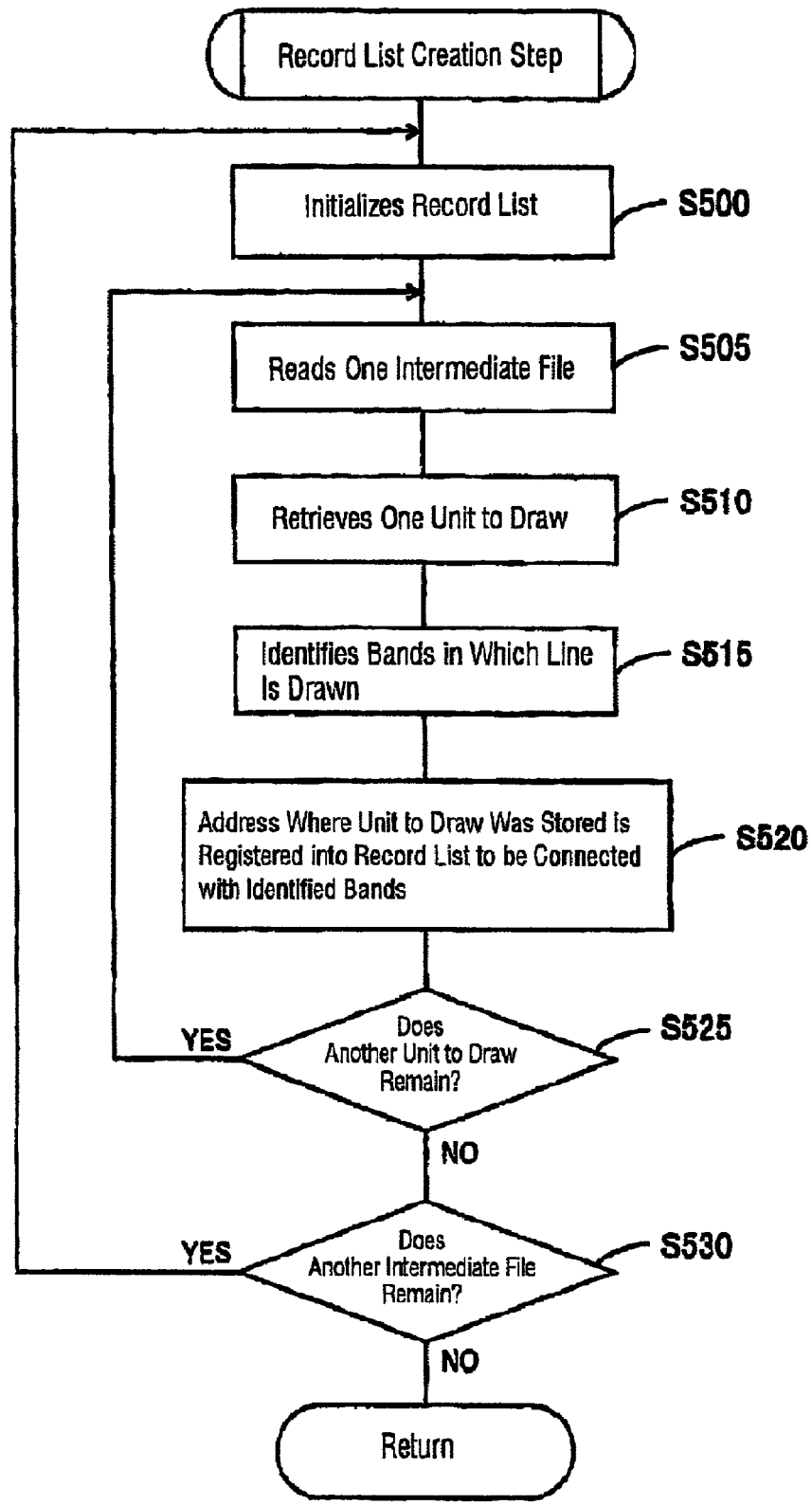
FIG. 25 is a flowchart outlining a record list creation step that is executed under the control of an actual-data-for-printing creation module of the printer driver.

FIG. 25 is a flowchart outlining the record list creation step that is carried out in the above-mentioned step S225. This step flow is executed by the computer 10 under the control of the actual-data-for-printing creation module m3.

When intermediate files are temporarily stored into the hard disk 15a, first, the record list existing on the RAM 14 is initialized (step S500). Then, the contents of one intermediate file only is read into the RAM 14 (step S505).

After the reading of the intermediate file, one unit to draw included in the read intermediate file is retrieved (step S510). If intermediate files F11 to F13, the example ones shown in FIG. 12, are temporarily stored into the hard disk 15a, unit to draw U1 is first retrieved. Then, according to the coordinates of the origin and end of the line to draw included in the unit to draw, out of the bands B1 to B5, bands across which the line is drawn, based on the unit to draw are identified (step S515). Now, look at the unit to draw U1 for line drawing, shown in FIG. 11. The line origin coordinates (X11, Y11) lie within the band B1 and its end coordinates (X12, Y12) lie within the band B2. Thus, the bands "B1" and "B2" are identified as the bands across which the line is draw, based on the unit to draw U1. Look at the unit to draw U2 shown in FIG. 11. The line origin coordinates (X11, Y11) lie within the band B1 and its end coordinates (X12, Y12) lie within the band B5. Thus, all bands "B1" and "B5" are identified as the bands across which the line is draw, based on the unit to draw U2.

Then, the address where the unit to draw was stored is registered in the record list so as to be connected with the bands identified in the step S515 (step S520). If, for example, the intermediate files F11 to F13 shown in FIG. 12 are created, the record list entries will be as shown in FIG. 13. Specifically, when the intermediate file F11 is handled, for the unit to draw U1 stored at address "00410000," address "00410000" is double-registered for the bands "B1" and "B2" in the record list R1. For the unit to draw U2 stored at address "00410100," address "00410100" is multi-registered for all bands in the record list R1. If the intermediate files F11 to F15 shown in FIG. 15 are created and when the intermediate file F11 is handled, for the unit to draw U1 stored at address "00410000," address "00410000" is registered for only the band "B1" in the record list R1 as shown in FIG. 16.

After the registration of the address of one unit to draw, judgment is made as to whether another unit to draw remains in the read intermediate file (step S525). If another unit to draw remains, the steps S505 to S530 are repeated to retrieve another unit to draw and execute subsequent steping by which further registration for the unit into the record list is performed.

Unless another unit to draw remains, judgment is made as to whether another intermediate file remains in the hard disk (step S530). If another intermediate file remains, the steps S595 to S530 are repeated to read another intermediate file and execute subsequent steping by which further registration for the file into the record list is performed.

When intermediate files to read become zero, this step flow terminates. Then, a record list R1 like its example shown in FIG. 13 or 16 has been created on the RAM 14.

Figure 26:
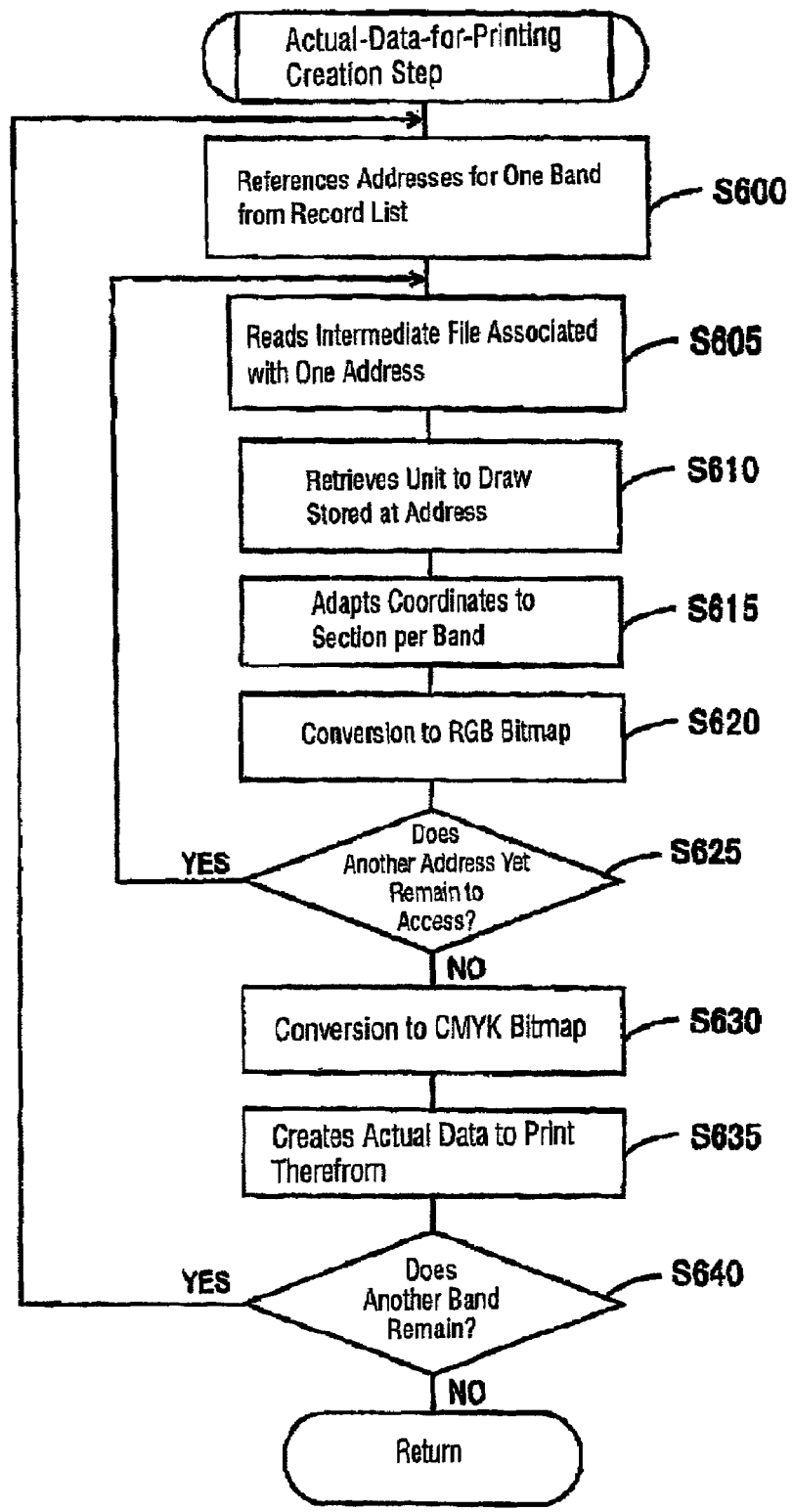
FIG. 26 is a flowchart outlining an actual-data-for-printing creation step that is executed under the control of the actual-data-for-printing creation module.

FIG. 26 is a flowchart outlining the actual-data-for-printing creation step that is carried out in the above-mentioned step S230. This step flow is also executed by the computer 10 under the control of the actual-data-for-printing creation module m3. This step flow is intended to create actual-data-for-printing separately for each of bands B1 to B5.

Once the record list has been created, first, address entries for one band are referenced from the record list (step S600). For the exemplary record list R1 shown in FIG. 13, addresses "00410000," "000410100," and "18410000" are referenced.

Then, an intermediate file corresponding to one of the referenced addresses is read from the hard disk 15a and its contents are loaded into the RAM 14 (step S605). Assume that the referenced address is "00410000" and the intermediate file F11 shown in FIG. 12 is temporarily stored into area of addresses "0040000" to "183FFFFF." Because address "00410000" falls within the range of addresses "0040000" to "183FFFFF," the intermediate file F11 is read. In this way, according to the address where a specific unit to draw of an instruction to draw was stored, the intermediate file corresponding to one of the bands into which page print area is partitioned can be read.

Note that a plurality of intermediate files are not simultaneously read into the RAM to make the occupied area of the RAM 14 as small as possible.

The unit to draw stored at the referenced address is retrieved (step S610). In the example shown in FIG. 12, the unit to draw U1 stored at address "00410000" is retrieved.

After the unit to draw is retrieved, the coordinates (of the origin and end of the line to draw) included therein are adapted to the section per band across which the line is drawn (step S615). This will be exemplified below by using the unit to draw U1 shown in FIG. 11. For U1, its line origin coordinates (X11, Y11) lie within the band B1 and its line end coordinates (X12, Y12) lie within the band B2. If actual-data-for-printing for band B1 is created, the X12 and Y12 coordinates must be changed.

If the y coordinate of the border line between the bands B1 and B2 is assumed to be Y0 (Y11<Y0<Y12), the line to draw, based on the unit to draw U1 intersects the border line at a point (X12', Y12'), where Y12'=Y0 and X12', can be obtained by executing proportional calculation, using the following equation:

[Equation 1]

$$X12' = X11 + (X12 - X11) \times \frac{Y0 - Y11}{Y12 - Y11} \quad (1)$$

For another example of the unit to draw U2 shown in FIG. 11, its line origin coordinates (X21, Y21) lie within the band B1 and its line end coordinates (X22, Y22) lie within the band B5. If actual-data-for-printing for band B2 is created, the coordinates X21, Y21, X22, and Y22 included in the unit to draw U2 must be changed. The coordinates can be adapted to the section of band B2, based on the same calculation. If the y coordinate of the border line between the bands B1 and B2 is assumed to be Y01 and the y coordinate of the border line between the bands B2 and B3 Y02 (Y11<Y01<Y02<Y12), the line to draw, based on the unit to draw U2 intersects these border lines at a point (X21', Y21') and a point (X22', Y22') respectively, where Y21'=Y01 and X22'=Y02, and X21' and X22' can be obtained by executing proportional calculation, using the following equations:

[Equation 2]

$$X21' = X21 + (X22 - X21) \times \frac{Y01 - Y21}{Y22 - Y21} \quad (2)$$

[Equation 3]

$$X22' = X21 + (X22 - X21) \times \frac{Y02 - Y21}{Y22 - Y21} \quad (3)$$

For the examples of the units to draw shown in FIG. 14, wherein they consist of bitmap data, the coordinates included therein need not be adapted to the section per band because they are created on a band-by-band basis (bands B1 to B5).

After the coordinates included in the unit to draw are adapted for band-by-band basis, the data of the unit to draw is converted to RGB bitmap, thus creating RGB bitmap data on the RAM 14 (step S620). Then, judgment is made as to whether another address yet remains to access (step S625). If another address remains, the steps S605 to S625 are repeated for further steping to get RGB bitmap data from another unit to draw.

Figure 27:
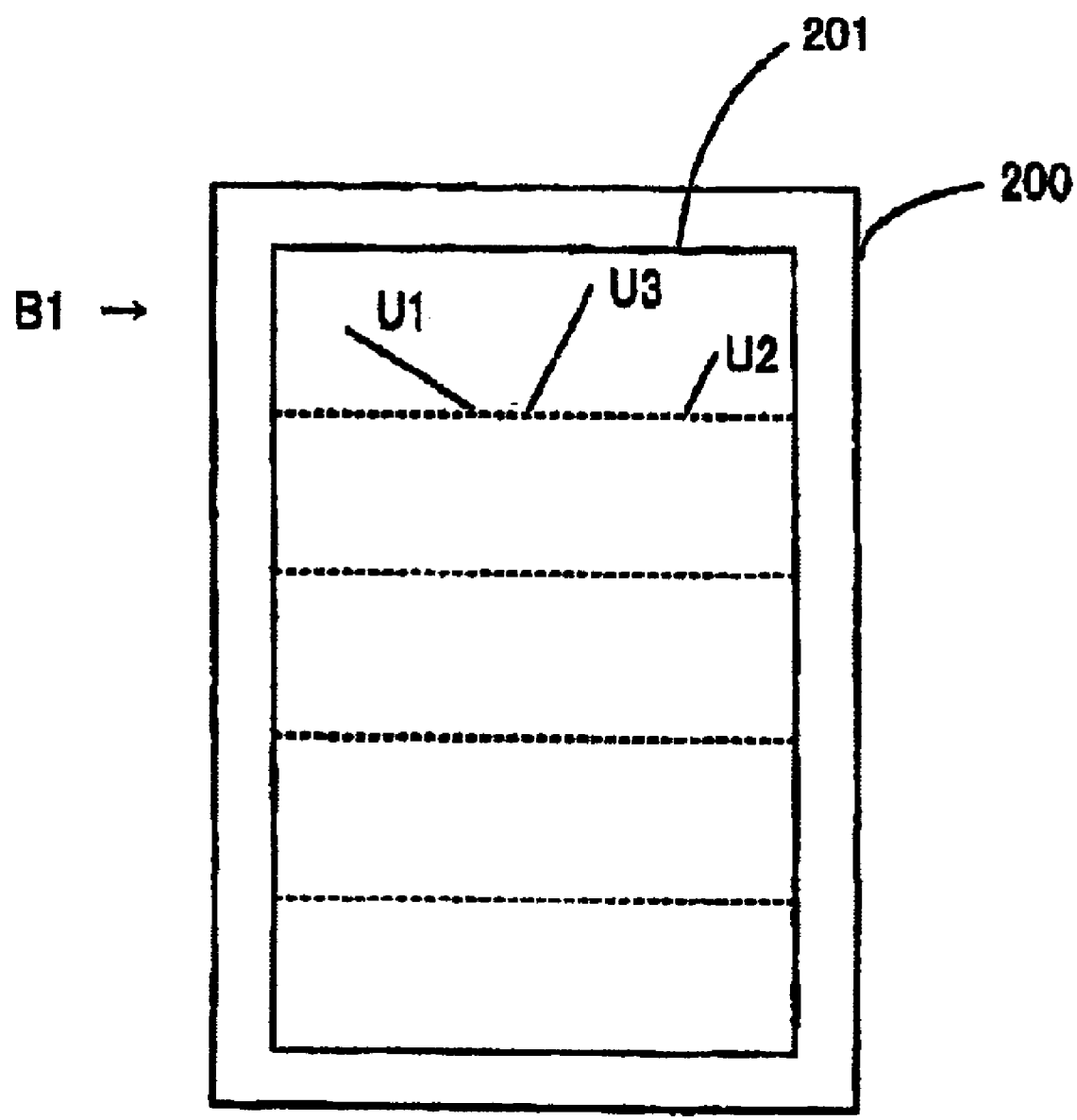
FIG. 27 is an illustration showing a print page state wherein sections of lines are printed within band B1 in the page print area on paper.

Unless another address remains, then RGB bitmap data for one band has been created. The created RGB bitmap data is converted to CMYK bitmap data, thus creating CMYK bitmap data on the RAM 14 (step S630). Furthermore, printing control code or the like is added to the created CMYK bitmap data, thus creating actual-data-for-printing (step S635). Now, actual-data-for-printing for one of the bands 202 has been created. Based on the actual-data-for-printing, then, the printer 20a prints things within one of the bands 202, which is exemplified in FIG. 27. FIG. 27 shows a print page state wherein sections of lines are printed within the band B1 in the page print area 201 on paper 200 on the assumption that units to draw U1 to U6 have line data.

Finally, judgment is made as to whether another band 202 remains (Step S640). If another band 202 remains, the steps S600 to S640 are repeated to reference address entries for another band from the record list and create actual-data-for-printing for the band. Unless another band 202 remains, then, actual-data-for-printing has been created for all bands and this step flow terminates.

The actual-data-for-printing creation step P3 is program code written to cause the hardware to read in turn the contents of the intermediate file or files created under the intermediate file creation step P2 and execute predetermined conversion of print data, thus creating actual-data-for-printing. Its function is implemented by the execution of the steps S225 to S230, S500 to S530, and S600 to S640. During that step, a record list is created in which the intermediate files are corresponding to a plurality of bands into which page print area is partitioned. By referring to this record list for each band, the intermediate file corresponding to band is read and actual-data-for-printing for each band is created.

By following the above-described step flows, actual-data-for-printing can be created from print data created by APL. During this step, the print data is divided into parts of data amount falling within certain bounds to file size and intermediate files of divisional print data are created. Thus, the intermediate file size does not become so huge as to make printing impossible.

The above-described step in which a record list is created and actual-data-for-printing is created per band from the intermediate file corresponding to band is only an illustrative example. It is possible to create actual-data-for-printing without creating a record list, that is, data is not divided into parts for bands.

Conversion of RGB bitmap data to CMYK bitmap by which actual-data-for-printing is created is also only an illustrative example. Alternatively, if, for example, monochrome printing is performed, actual-data-for-printing would be created by converting RGB bitmap data to bitmap for monochrome printing.

In the above-described embodiment, for print data consisting of bitmap data, intermediate files of divisional data on the band-by-band basis are created, and from these files, actual-data-for-printing is created. However, even for bitmap data, it is also possible to create intermediate files of divisional data that falls within certain bounds to file size, but is not separate for each band and create actual-data-for-printing from these files.

Figure 28:
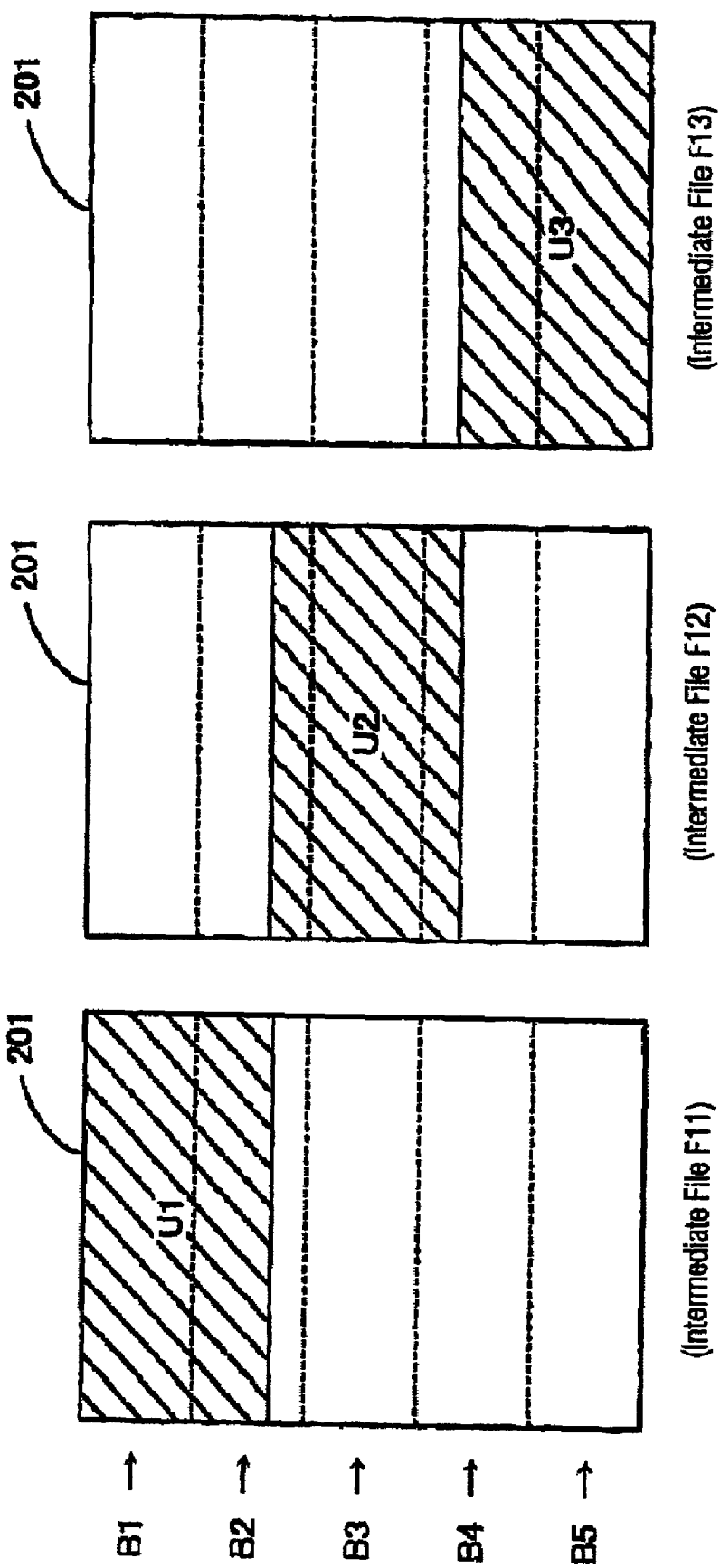
FIG. 28 is an illustration that schematically shows page print area partitioned into zones where bitmap is printed, based on bitmap data units to draw, including page aspects provided for each intermediate file.

This will be specifically explained below by using print data consisting of bitmap data shown in FIG. 8 as an example. Assume that the amount of the bitmap data is 714 MB and the bounds to file size are 256 MB that is default setting. 714 MB is divided by 256 MB, then a quotient of "2.8" is obtained and raised to "3." By dividing "714 MB" by "3." a quotient of "238 MB" is obtained. Thus, it is possible to create intermediate files such that each file contains divisional data of "238 MB." In this case, units to draw U1 to U3 contained in intermediate files F11 to F13 respectively do not match with all bands B1 to B5 as is shown in FIG. 28. Thus, a record list R1 as is shown in FIG. 29 is created. For example, unit to draw U1 stored at address "00410000" is contained in the intermediate file F11 and its bitmap is drawn across bands B1 and B2. Thus, address "00410000" is registered for bands B1 and B2 in the record list R1.

From these intermediate files F11 to F13, actual-data-for-printing is created by following the same procedure as described for the above-mentioned steps S600 to S640. Thereby, RGB bitmap data for bands B1 to B5 and actual-data-for-printing can be created. For example, RGB bitmap data for band B2 is created as follows: refer to addresses "00410000" and "10410000" for band B2 from the record list R1; read the intermediate file corresponding to one of these addresses; and extract bitmap for band B2 from the bitmap data contained in that intermediate file; and adapt the coordinates for band B2.

In accordance with the present invention, as explained above, a print-control program can be provided that is built to print objects in such a manner that printing can certainly be done even if a huge amount of print data is created. Obviously, the present invention is also applicable as a medium having such print-control program recorded thereon. Because the print-control program of the present invention is implemented on a computer in which it is installed, the invention is also applicable as a tangible apparatus incorporating such computer. Program-controlled print operation is carried out by following a predetermined control procedure in which the above-described steps of the program are executed appropriately and the invention obviously underlies that procedure. Thus, the present invention is also applicable as the method for print control.

I claim:

1. A computer readable storage medium having a print-control program to acquire print data, that creates intermediate files of the print data, reads the files into a memory, converts the files, and creates actual-data-for-printing, said print control program comprising:
    a print data acquisition step to acquire print data of a page;
    an intermediate file creation step to divide the acquired print data of a page into parts wherein a file size of each said part is within predetermined bounds, and to create a plurality of intermediate files; and
    an actual-data-for-printing creation step to read the plurality of intermediate files into memory for predetermined conversions, and create actual-data-for-printing from the plurality of intermediate files,
    wherein said actual-data-for-printing creation step further includes:
        creating a record list that makes the plurality of intermediate files correspond to a plurality of target zones into which a page print area is partitioned;
        referring to the record list for each said target zone; and
        reading the intermediate files corresponding to each said target zone into the memory; and
        creating said actual-data-for-printing for each said target zone.

2. A medium having a print-control program according to claim 1, further comprising a step for setting the predetermined bounds to a file size based on a user-preference setting, wherein at said intermediate file creation step, the acquired print data of a page are divided so as to create said plurality of files within said predetermined bounds set by said user-preference setting.

3. A medium having a print-control program according to claim 1, wherein at said intermediate file creation step, setting said predetermined bounds to a file size depending on free space in the memory.

4. A medium having a print-control program according to claim 1, wherein said actual-data-for-printing creation step reads only one of the plurality of intermediate files into the memory at a time.

5. A medium having a print-control program according to claim 1, wherein said actual-data-for-printing creation step further comprises:
    registering an address having a unit to draw included in an intermediate file, into said record list in such a manner as to make the address connected with one or a plurality of said target zones for all units to draw filed in the intermediate files created;
    referencing an address or addresses connected with each said target zone from the record list; and
    reading the unit or units to draw stored at the referenced address or addresses into the memory.

6. A medium having a print-control program according to claim 1, wherein in creating a plurality of intermediate files of divisional bitmap data at said intermediate file creation step, the acquired print data that consists of bitmap data are divided into a plurality of parts of the bitmap data corresponding to said target zones.

7. An apparatus for print control which acquires print data, creates intermediate files of print data, reads the files into a memory, converts the file, and creates actual-data-for-printing, said apparatus comprising:
    a print data acquisition unit to acquire print data of a page;
    an intermediate file creation unit to divide the acquired print data of a page into parts wherein a file size of each said part is within predetermined bounds, and to create a plurality of intermediate files; and
    an actual-data-for-printing creation unit to read the plurality of intermediate files into the memory for predetermined conversions that creates actual-data-for-printing from said plurality of intermediate files,
    wherein said actual-data-for-printing creation unit further includes:
        a record list that makes the plurality of intermediate files correspond to a plurality of target zones into which a page print area is partitioned, so that by referring to the record list for each said target zone and reading the intermediate files corresponding to each said target zone into the memory, said actual-data-for-printing for each said target zone is created.

8. A method for print control which acquires print data, creates intermediate files of the print data, reads the files into a memory, converts the files, and creates actual-data-for-printing, said method comprising:

a print data acquisition step to acquire print data of a page;

an intermediate file creation step to divide the acquired print data of a page into parts wherein a file size of each said part is within predetermined bounds, and to create a plurality of intermediate files; and an actual-data-for-printing creation step to read the plurality of intermediate files into the memory for predetermined conversions that creates actual-data-for-printing from said plurality of intermediate files, wherein said actual-data-for-printing creation step further includes:

creating a record list that makes the plurality of intermediate files correspond to a plurality of target zones into which a page print area is partitioned;

referring to the record list for each said target zone; and reading the intermediate files corresponding to each said target zone into the memory; and creating said actual-data-for-printing for each said target zone.

* * * * *